US011523334B1

(12) United States Patent
Newman et al.

(10) Patent No.: US 11,523,334 B1
(45) Date of Patent: *Dec. 6, 2022

(54) NETWORK DATABASE FOR RAPID, LOW-COMPLEXITY 5G/6G NETWORK ACCESS

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,733

(22) Filed: Jul. 28, 2022

Related U.S. Application Data

(63) Continuation of application No. 17/584,764, filed on Jan. 26, 2022, now Pat. No. 11,438,834.
(Continued)

(51) Int. Cl.
*H04W 48/20* (2009.01)
*H04W 48/16* (2009.01)
(Continued)

(52) U.S. Cl.
CPC .......... *H04W 48/20* (2013.01); *H04W 48/16* (2013.01); *H04W 56/001* (2013.01); *H04W 60/04* (2013.01); *H04W 74/0833* (2013.01)

(58) Field of Classification Search
CPC ... H04W 48/20; H04W 48/16; H04W 56/001; H04W 60/04; H04W 74/0833
See application file for complete search history.

(56) References Cited

U.S. PATENT DOCUMENTS

2001/0055976 A1   12/2001   Crouch
2002/0069211 A1   6/2002   Kondo
(Continued)

FOREIGN PATENT DOCUMENTS

CN   112640394 A   4/2021
CN   113825244 A   12/2021
(Continued)

OTHER PUBLICATIONS

Translation of JP-2013187835-A (Year: 2013).*

*Primary Examiner* — Said M Elnoubi
(74) *Attorney, Agent, or Firm* — Mayer & Williams PC

(57) ABSTRACT

Disclosed are faster, simpler procedures for finding and registering on a 5G or 6G network. First, a prospective user device determines, from a searchable network database of system information, which base station is closest to the user device, and whether the base station is accepting new users. The user device also determines, from the network database, system information about the base station including frequencies of the base station's broadcast channel and random access channel, and like parameters. Then, the user device can synchronize its clock and timing by detecting any message transmitted on the broadcast or random access channel, or by locking to an external time-base such as a navigation satellite timing signal. The user device can then transmit an entry message, such as a random access preamble, or other type of message requesting entry into the network. Many other aspects and advantages of rapid network access are disclosed.

11 Claims, 7 Drawing Sheets

Related U.S. Application Data

(60) Provisional application No. 63/255,586, filed on Oct. 14, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
  *H04W 74/08* (2009.01)
  *H04W 60/04* (2009.01)
  *H04W 56/00* (2009.01)

(56) References Cited

U.S. PATENT DOCUMENTS

| | | |
|---|---|---|
| 2003/0125046 A1 | 7/2003 | Riley |
| 2010/0128698 A1 | 5/2010 | Ishizu |
| 2010/0222082 A1 | 9/2010 | Ishii |
| 2010/0255837 A1 | 10/2010 | Kuo |
| 2011/0176523 A1 | 7/2011 | Huang |
| 2011/0238286 A1 | 9/2011 | Roesser |
| 2012/0021743 A1 | 1/2012 | Filipovic |
| 2012/0077487 A1 | 3/2012 | Yang |
| 2013/0231132 A1 | 9/2013 | Huang |
| 2014/0038634 A1 | 2/2014 | Eskicioglu |
| 2015/0173004 A1 | 6/2015 | Nigam |
| 2015/0195057 A1 | 7/2015 | Tan |
| 2015/0201303 A1 | 7/2015 | Ji |
| 2015/0215790 A1 | 7/2015 | Davari |
| 2015/0244672 A1 | 8/2015 | Singhal |
| 2015/0319790 A1 | 11/2015 | Haro |
| 2016/0205503 A1 | 7/2016 | Zhyshko |
| 2016/0247140 A1 | 8/2016 | Bakshi |
| 2017/0086131 A1* | 3/2017 | Gupta ............... H04W 72/042 |
| 2017/0347231 A1 | 11/2017 | Zhyshko |
| 2018/0027545 A1 | 1/2018 | Kato |
| 2019/0215777 A1 | 7/2019 | Kang |
| 2020/0212932 A1 | 7/2020 | Bier |
| 2021/0058788 A1 | 2/2021 | Su |

FOREIGN PATENT DOCUMENTS

| | | |
|---|---|---|
| JP | 2011211256 A | 10/2011 |
| JP | 20130187835 A | 9/2013 |
| WO | 2019235999 A1 | 12/2019 |

* cited by examiner

NETWORK DATABASE FOR RAPID, LOW-COMPLEXITY 5G/6G NETWORK ACCESS

PRIORITY CLAIMS AND RELATED APPLICATIONS

This application is a continuation of U.S. patent application Ser. No. 17/584,764, entitled "Searchable Database of 5G/6G Network Access Information", filed Jan. 26, 2022, which claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/255,586, entitled "Searchable Database of 5G Network Access Information", filed Oct. 14, 2021, all of which are hereby incorporated by reference in their entireties.

FIELD OF THE INVENTION

The disclosure involves ways to locate and connect to a 5G or 6G wireless network.

BACKGROUND OF THE INVENTION

Before communicating on a 5G/6G cell or network, a new user is required to perform a multi-step process of finding, initially contacting, registering, and eventually being authenticated on the network, a process that involves complex computations, significant delays, and many uncertainties. What is needed is a way for new users to find and communicate with a local base station, with less complexity and delay.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is non-transitory computer-readable media wherein: the media contain a database comprising a plurality of entries, each entry comprising data about a wireless network base station associated with the entry; each entry further includes an indication of a location of the associated base station or the associated base station's antenna; each entry further includes a frequency of a random access channel and a frequency of a broadcast channel of the associated base station; and the database is configured to be searchable according to a user-specified or user-associated location.

In another aspect, there is non-transitory computer-readable media in a user device of a wireless network, the media containing instructions that when executed by a computing environment cause a method to be performed, the method comprising: determining a location of the user device; receiving or downloading a network database, or a portion thereof, the network database comprising a plurality of entries, each entry comprising location data of a base station associated with the entry; and automatically, without human intervention: determining, by searching the network database, a particular base station that accepts new user devices and is closest to the user device; determining, according to a particular entry associated with the particular base station, a frequency of a broadcast channel of the particular base station and a frequency of a random access channel of the particular base station; and transmitting, to the particular base station, an entry message requesting entry into the wireless network of the particular base station.

In another aspect, there is a base station of a wireless network, the base station configured to: allocate a low-complexity channel comprising a frequency or a frequency band for transmission of low-complexity messages; wherein: each low-complexity message comprises an identification code of a transmitting user device or a recipient user device or both; and the identification code or codes are transmitted in plain text, wherein plain text comprises without scrambling or encoding, other than modulation for transmission; specify one or more limitations for messages on the low-complexity channel, the limitations comprising a maximum message size and a maximum message QoS (quality of service); receive an uplink message on the low-complexity channel; and transmit a downlink reply message on the low-complexity channel, the downlink reply message responsive to the uplink message.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1:
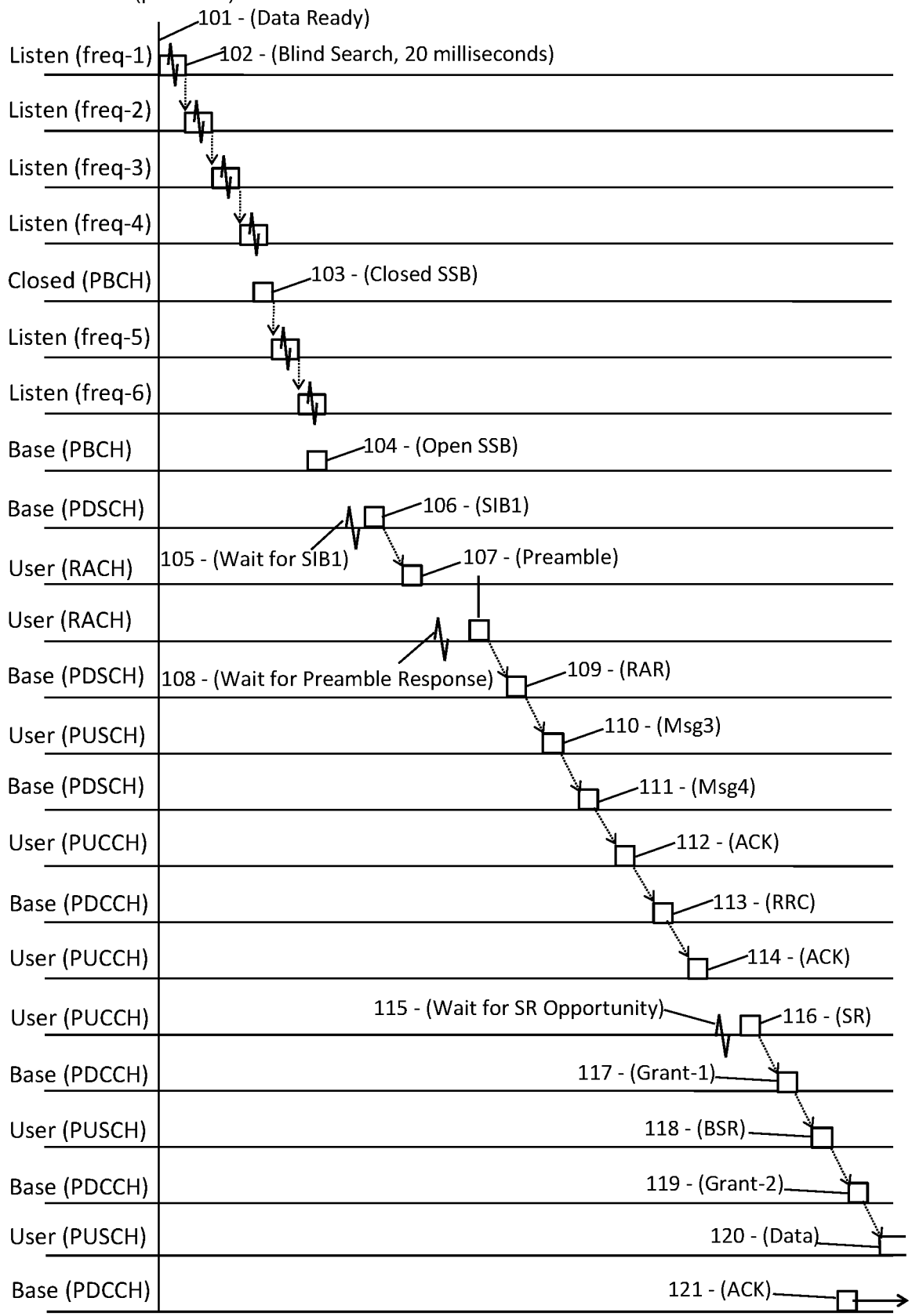
FIG. 1 is a sequence chart showing steps for a user device to become registered on a 5G or 6G network, according to prior art.

Advanced 5G and 6G technologies are designed for eMBB (enhanced Mobile Broadband communications), URLLC (ultra reliable low latency communications), and mMTC (massive machine-type communication) generally involving large numbers of user devices such as vehicles, mobile phones, self-propelled and robotic machines, portable and stationary computers, and many other advanced wireless instruments. A new user that wishes to transmit a data message in 5G or 6G is required to perform a complex series of steps starting with a "blind search" through a potentially large number of frequencies until finding a system information message from one of the base stations in range, and then following a multi-step procedure of message exchanges and delays before being able to transmit the data message. Many planned wireless devices, and especially future IoT (internet of things) applications, involve low-cost mMTC devices with reduced capabilities (RedCap) which may have difficulty completing this arduous initialization process.

Disclosed herein are low-complexity procedures enabling user devices to find 5G or 6G base stations, make initial contact with them, and continue communicating wirelessly. Systems and methods disclosed herein (the "systems" and "methods", also occasionally termed "embodiments" or "arrangements", generally according to present principles) can provide urgently needed wireless communication protocols to reduce access complexity and delays, provide low-complexity options to accommodate reduced-capability user devices, and facilitate messaging for both reduced-capability and high-performance wireless devices in networks such as 5G and 6G networks, according to some embodiments. 5G and 6G are designed to maximize performance, as measured by high volume capacity, high speed data flow, low latency, and highly reliable communications among wireless devices that are assumed to be highly competent. To meet these demands, 5G and 6G procedures involve a quantum leap in complexity. However, many if not most of the wireless IoT devices are expected to be low-cost, narrow-bandwidth, reduced-capability devices such as single-purpose sensors and actuators. Many if not most of these applications have minimal communication requirements and may not need the low latency or high reliability or other high-performance features of full 5G/6G. Many if not most of the future IoT devices may have difficulty complying with the complex requirements of 5G and/or 6G. An efficient way to accommodate both high-performance users and reduced-capability devices may be to provide low-complexity alternatives and options in a manner that avoids burdening base stations and avoids interfering with higher-priority users. That is the intent of the procedures presented below.

The disclosed systems and methods are generally intended to facilitate "initialization" which includes a prospective user device finding a suitable base station ("discovery"), acquiring system information about the base station's network, making initial contact with the base station, receiving and processing an initial response message from the base station, and completing the registration process on that network. Examples of the systems and methods may include a publicly-accessible "network database" containing information about base stations. The network database may be searchable by location, thereby providing system information to a user device regarding base stations near the user device. The network database may also provide system information such as access codes, frequencies, timing, and other parameters, of each base station. Additional disclosures may include a low-complexity channel or allocated frequency, on which reduced-capability user devices may communicate. In some embodiments, the systems and methods may be enhanced by artificial intelligence (AI) and/or distributed ledger ("blockchain") technology, as detailed below. In some embodiments, the low-complexity procedures may avoid certain signal processing and computational steps employed in standard 5G/6G communications such as: "scrambling" in which a message or an error-check code is mixed with an identity code of the intended recipient; "discrete Fourier transform (DFT) precoding"; "rate-matching", "bit interleaving", "segmenting", "turbo encoding", "column permutation", and other operations intended to optimize performance for high-end users but may excessively burden reduced-capability user devices. Instead, in examples below, a message may be modulated directly from the cleartext (that is, without encoding, other than modulation). The modulated message may then be transmitted sequentially on a particular frequency or multiplexed among multiple subcarriers. The receiving entity may demodulate and interpret the message without further processing.

Terms herein generally follow 3GPP (third generation partnership project) standards, but with clarification where needed to resolve ambiguities. As used herein, "5G" represents fifth-generation, and "6G" sixth generation, wireless technology. "NB-IoT" (narrow-band Internet-of-things) and "5G-Light" are versions that provide slightly reduced complexity and bandwidth requirements. A network (or cell or LAN or local area network or the like) may include a base station (or gNB or generation-node-B or eNB or evolution-node-B or access point) in signal communication with a plurality of user devices (or UE or user equipment or user nodes or wireless transmit-receive units) and operationally connected to a core network (CN) which handles non-radio tasks such as administration, and is usually connected to a larger network such as the Internet. The time-frequency space is generally configured as a "resource grid" including a number of "resource elements", each resource element being a specific unit of time termed a "symbol" or "OFDM symbol" (orthogonal frequency-division multiplexing) interval, and a specific frequency and bandwidth termed a "subcarrier" (or "subchannel" in some references). Each modulated resource element may include, or be in addition to, a brief "cyclic prefix" which is treated as a short guard space herein. The time domain may be divided into ten-millisecond frames, one-millisecond subframes, and some number of slots, each slot including 14 symbols. The number of slots per subframe ranges from 1 to 8 depending on the "numerology" selected. The "numerology" of a resource grid corresponds to the subcarrier spacing in the frequency domain. Subcarrier spacings of 15, 30, 60, 120, and 240 kHz are defined in various numerologies. The frequency axis is divided into "resource blocks" including 12 subcarriers. Each subcarrier is at a slightly different frequency. Each subcarrier can be independently modulated to convey message information. Thus a resource element, spanning a single symbol in time and a single subcarrier in frequency, is the smallest unit of a message.

In addition, the following terms are used herein. Each modulated reference element of a message is often referred to as a "symbol" in references, but this may be confused with the same term meaning a time interval. Therefore, for specificity, each modulated reference element of a message is referred to as a "modulated message resource element" or simply a "message element" in examples below. Likewise, each resource element of a demodulation reference message is referred to as a "reference element" herein. A message may be configured "time-spanning" by occupying sequential symbols at a single frequency, or "frequency-spanning" on multiple subcarriers or subchannels at a single time, or in a rectangular or other shape portion of the resource grid, as directed by the base station. These terms are often confused with "TDD" (time-division duplexing) and "FDD" (frequency-division duplexing), which refer to message duplexing. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A message is "faulted" or "corrupted" if one or more bits of the message are altered relative to the original message. "Random" and "pseudorandom" may be used interchangeably.

"Low-complexity" refers to devices and procedures necessary for wireless communication, exclusive of devices and procedures that provide high-performance communication. 5G/6G includes many procedures and requirements greatly exceeding those necessary for wireless communication, but necessary for high volume at low latency and high reliability. Compared to scheduled and managed 5G and 6G messaging, low-complexity procedures generally require less computation and less signal processing. In some embodiments, low-complexity messages may be time-spanning and TDD for ease of reception by a reduced-capability receiver. In other embodiments, the messages may be frequency-spanning and FDD duplexing. Many of the systems and methods disclosed herein may be applicable to both time-spanning and frequency-spanning messages, and to TDD and FDD duplexing. In some embodiments, a low-complexity message may include message elements modulated directly from the initial message, without further encoding or other modifications, so that each received message element can be demodulated and interpreted according to the original message data without additional signal processing or other processing. In other embodiments, additionally encoding may be included, such as scrambling and the like.

Low-complexity procedures may be tailored to minimize the number of separate operations required of a device. For example, 5G and 6G user devices may be required to wait for permission to request permission to transmit a short message requesting permission to transmit a data message, whereas a low-complexity procedure may involve a user device transmitting the data message at-will and/or grantless, according to some embodiments. For maximum speed and performance, 5G/6G specifications include a very wide range of options and contingencies and versions and formats and types and modes for many operations, whereas a low-complexity specification may include defaults for each operation, and those defaults may be the simplest choices, or at least simpler than standard 5G and 6G procedures. As used herein, "simpler" procedures are procedures requiring fewer computation steps and/or smaller memory spaces than corresponding procedures in standard 5G and 6G. Computation steps may be measured in floating-point calculations or equivalent, for example. The intent of low-complexity protocols may be to provide means for a single-purpose wireless product to be developed around a simple low-cost transceiver and a simple processor such as a microcontroller or ASIC (application-specific integrated circuit) implementing those defaults, wherein the resulting product meets the low-complexity requirements of 5G and 6G while avoiding interfering with normal users or burdening the base station.

As used herein, "low-complexity channel" refers to a frequency or a band of frequencies allocated for reduced-capability user communications meeting certain predetermined criteria. The criteria may include a limit on the size of messages, a limit on the number of messages or volume per day, a limit on the transmitted power level, a QCI (QoS class identifier). For example, the QCI may be set at level 7, corresponding to gaming activity which allows a packet loss rate of 1% or more and a packet delay of 1 second or more. Communications on the low-complexity channel may be transmitted at-will or without grant, according to some embodiments. In other embodiments, a grant or contention-free transmission protocol may be provided. Transmissions may be narrow-band such as 100 kHz, single-tone or single-frequency, and may be time-spanning, according to some embodiments. In other embodiments, wider bandwidths and frequency-spanning messages may be supported. The low-complexity channel may employ a default modulation scheme such as QPSK or BPSK and a default demodulation reference, according to some embodiments. Messages transmitted by user devices may be aligned with the resource grid and may be managed by a base station which transmits time-alignment messages, in some embodiments. In other embodiments, the messages may have no synchronization with the base station's resource grid. When transmitting grantless or with contention, user devices may be expected to monitor the channel during an LBT (listen-before-talk) interval before transmitting to avoid collisions. Upon receiving a faulted message, a user device may transmit a non-acknowledgement NACK to the originator, requesting a retransmission. Alternatively, the recipient may decline to transmit any acknowledgement, in which case the transmitting entity may retransmit the message upon failing to obtain an acknowledgement. User devices may be limited as to the number of retransmission attempts before dropping the message.

"Reduced-capability" refers to wireless devices that cannot comply with 5G or 6G protocols, absent the systems and methods disclosed herein. For example, regular users in 5G/6G are required to receive a 5 MHz bandwidth in order to receive system information messages. Regular user devices are required to perform high-speed signal processing such as digitizing the received waveform, applying digital filtering or Fourier transforming of an incoming waveform at several GHz frequency, and separating closely-spaced subcarriers. 5G and 6G messages are generally processed before transmission by scrambling, interleaving, and rate-matching. However, each of these steps requires a corresponding reverse process by the receiving device, often at substantially greater effort, and usually by a user device with substantially lower capabilities than the base station. The user device must perform blind descrambling and decoding and de-interleaving and de-rate-matching on received control messages throughout a huge search space in real-time while the signal is arriving, among many other compute-intensive high-speed operations. A reduced-capability device, on the other hand, may not need the high performance gained by such procedures, and may be incapable of performing them. A reduced-capability device may be able to receive a narrow-band wireless signal, demodulate the message, and interpret the contents without further processing.

In addition, high-performance 5G/6G devices are expected to convert standard messages, such as an initial access message, a multiplexed acknowledgement, or a demodulation reference message, into a much longer sequence of encoded bits following complex formulas before transmitting. A reduced-capability device may not be able to implement some of these requirements. The reduced-capability device may be able to transmit and receive plain-text messages, modulated according to a default modulation scheme, but without the scrambling and encoding and so forth of regular 5G and 6G. Instead of using scrambling as an identification method, a low-complexity message may identify the intended recipient plainly, in which case the error-detection code may be used for detecting and potentially correcting faulted messages, or at least requesting a retransmission. Such a reduced-capability device or application may not need the ultimate high performance that 5G and 6G are capable of, and may be fully satisfied by a much lower level of communication which is compatible with low-cost or single-purpose devices, using default parameters and procedures when possible, and implemented in software configured to support the application itself rather than complex 5G/6G protocols.

Communication in 5G/6G generally takes place on abstract message "channels" representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels, termed "RACH" herein, also called PRACH in references, represents both abstract and physical random access channels, including potentially multiple random access channels in a single cell, and configured for uplink and/or downlink, as detailed below. "CRC" (cyclic redundancy code) is an error-checking code. "RNTI" (radio network temporary identity) is a network-assigned user code.

5G and 6G references often use the same term for two different things. For example, "RACH" may refer to a random access message or to the channel on which it is transmitted, "PBCH" may refer to a system information message or to the time-frequency resources on which it appears, "collision" may refer to simultaneous interfering messages or to actual vehicle collisions. A "coincident collision" occurs when two devices transmit messages at exactly the same time. Disambiguation will be provided when necessary. Mathematical expressions may be explicitly ordered using parentheses, such as "A times (B plus C)" which means "add B to C, and then multiply that sum by A". In 5G/6G references, the term "symbol" is used in multiple ways. A symbol may refer to a time interval equal to 1/14 of a slot. In that sense, a symbol includes, typically, thousands of resource elements spanning thousands of subcarriers. In other contexts, a symbol may refer to a particular modulated resource element of a message, that is, wave information at a particular time and a particular frequency, regardless of whether the message is time-spanning or frequency-spanning. For specificity, as mentioned, each modulated resource element of a message will be referred to as a "message element" herein.

Past networks in 5G or 6G were generally designed to serve highly competent computers and smartphones that include high-performance processors with highly refined software. Prioritizing speed and performance over simplicity has led to high-speed, high-capacity networking, but has excluded many use cases centered on low-cost devices with minimal communication needs. Alternatives and options, as disclosed herein, may enable 5G and 6G networks to accommodate such devices while minimizing demands on the network. Reduced-capability user devices that do not require high speed or other advanced 5G/6G features may therefore become feasible if such low-complexity options are available. The present disclosure provides low-complexity messaging and procedures by avoiding operations not essential for communication and by providing easily-implemented alternatives when they are essential for communication. Application developers will demand ways to access networks using bandwidths and protocols appropriate to the simpler devices. It is important to provide such low-complexity options early in the 6G roll-out, while such flexibility can still be incorporated in the system design. The current disclosure is aimed at fulfilling that need.

FIG. 1 is a sequence chart showing a series of tasks which a prospective user device is required to perform before transmitting a data message on a 5G or 6G network, according to prior art. The horizontal axis represents time, and various signals and actions of the user device and the base station are shown along horizontal lines representing various message channels. Thus the sequence chart resembles an oscilloscope or signal analyzer display. Dotted arrows show simultaneity or causation. Items that are too long to fit in the chart are drawn shortened, or reduced in duration, as indicated by a jagged line.

At time 101, the user device has a data message ready to transmit. But first, the user device is required to find a suitable network, then join or register on the network, then perform a series of additional steps to obtain uplink permission. The user device starts with a "blind search" to find a base station with sufficient reception, by listening on each frequency of a "frequency raster" or "synchronization raster" of frequencies that base stations may transmit on. Each base station periodically transmits system information on one of the raster frequencies. The system information is a synchronization signal block (SSB), transmitted on the broadcast channel of each base station. The SSB periodicity is usually 20 milliseconds, so the user device must dwell on each of the frequencies for this amount of time before moving on. The listening interval 102 is shown greatly shortened in the chart because it would not fit on the page if drawn proportional to the long 20 millisecond dwell time. A jagged line indicates that the block representing the listening interval 102 has been graphically shortened in this way.

To perform the blind search, the user device listens first on frequency freq-1 for the full 20 milliseconds, but unfortunately no base stations within range are transmitting on freq-1. Therefore, at the end of the listening interval, the user device then switches to freq-2 and tries again. When that fails, the user device tries freq-3, and subsequently freq-4. The user device finally detects an SSB message 103 on freq-4, but unfortunately the SSB data 103 indicates that the transmitting base station is closed, that is, private or otherwise not available to take new entries. Therefore the user device continues blind-searching. Next it tries freq-5 which is silent. Finally at freq-6, the user device receives an SSB message 104 from an open (that is, available to receive new entrants) base station. The user device also acquires, from the SSB 104, system information related to timing and other frequencies needed to receive further system information about the selected base station.

Following the instructions contained in the SSB 104, the user device then seeks a message termed SIB1 (system information block number one), on the downlink shared channel. Base stations generally transmit their SIB1 messages at 160 millisecond intervals, so the user device waits additional time 105, and then receives the SIB1 message 106. The SIB1 message 106 contains information needed by the user device to transmit on the base station's random access channel.

Following the instructions in the SIB1 message 106, the user device then transmits a "preamble" message 107, indicating a request for service, on the random access channel. The user device then waits 108 for a response from the base station, but unfortunately the user device fails to receive a response during a predetermined interval, in this example. The problem may be that a message collision or noise or interference occurred, or possibly that the preamble 107 was transmitted at insufficient power for the base station to receive it. Therefore, the user device transmits the preamble 107 again, but with a higher transmission power. This time the base station receives the preamble 107 and replies with a random access response (RAR) message 109. The RAR 109 includes further system information, a TC-RNTI (temporary cell radio network temporary identification), a timing adjustment to improve the synchronization between the user device and the base station, and a grant or permission to transmit on the uplink shared channel. The user device then transmits a message termed Msg3 110 which includes the user device's globally unique MAC (media access control) address. The base station replies with Msg4 111 which refers to the MAC address and thereby resolves any ambiguities that may have arisen in the message chain. The base station also assigns a C-RNTI (cell radio network temporary identification) number to the user device, after which the user device replies with an acknowledgement ACK 112 using its new C-RNTI.

The user device is now registered on the network, but before transmitting the data message, the user device needs to obtain permission to obtain permission to obtain a grant for the data message, involving another cascade of messages and delays. In this example, the base station automatically transmits an RRC (radio resource control) message 113 indicating certain times when the user device is allowed to transmit an SR (scheduling request) message. The user device receives the RRC message 113 and transmits an acknowledgement 114. The user device then waits 115 for its next SR opportunity, When the user's turn comes, the user device sends a short SR message 116 on the uplink control channel. The base station responds to the SR request 116 by transmitting a grant message 117 (Grant-1) which, in effect, asks how large the planned data message will be. The user device then transmits a buffer state report (BSR) message 118 indicating the size of the data message. The base station then provides a Grant-2 message 119, so that the user device can transmit the data message 120 (partially showing). After receiving the data message 120, the base station transmits an acknowledgement ACK 121 (arrow, off chart), thereby completing the process.

For clarity, many other steps are omitted from the chart, but the same will be understood to one of ordinary skill in the art. In the blind search, the user device generally explores all of the frequencies in the raster, and then selects whichever base station has the best signal, but in the figure only a few frequencies are shown as being checked. Often the user device has to transmit the preamble 107 multiple times with increasing power, but in this case the user device only sent the preamble 107 twice. The downlink messages RAR 109, Msg4 111, the RRC 113, and the grants 117 and 119 are shown as simply received messages, but in fact all downlink control communications in 5G and 6G involve many additional steps. For example, each downlink reception includes a search (also termed a "blind search", not to be confused with the initial frequency raster search) encompassing a large number of possible times, frequencies, formats, message sizes, and locations at which a downlink message may appear. In addition, the user device must test each candidate signal to determine whether the signal contains a message addressed to the user device. The sizes and configurations of the downlink messages are variable, so the user device is required to test all versions at each time and at frequency, to keep from missing a downlink message. In addition, the messages may be scrambled according to the user device's identification code, or one of the group codes, or a system code, or a broadcasting code, among other encodings, all of which must be tested by the receiving entity upon every candidate downlink control signal. In addition, the messages may be encoded in various ways (polar, Fourier, etc.) and bit-manipulated in various ways (rate-matched, interleaved, punctured, multiplexed, etc.), all of which further challenges the receiver trying to decipher and unwrap each layer. None of these steps were included in the chart, for lack of space.

In addition, many base stations transmit messages in specific directions or "beams", and further steps and delays (not shown in the chart) are required to vary the beam direction and power, and for the user device to transmit messages to assist in selecting the best beaming combination. In addition, if a collision had occurred during the registration sequence, the MAC address reflected in Msg4 111 would not have matched the user device's identity, in which case the user device would have to start the registration steps over. The chart shows the base station providing the RRC message 113 automatically, but in many cases the user device must request it using a special SR request on the random access channel. Even with assigned SR opportunities, the user device's first SR request is often not successful for various reasons, in which case the user device is required to wait for the next SR opportunity before trying again. However, each user device is permitted only a certain number of SR attempts, after which the message is abandoned. In addition, the data message 120 was assumed to be received without fault in this chart, but if noise or interference had occurred during the data message 120, the base station would have transmitted a non-acknowledgement NACK instead of the ACK 121, and the user device would then either retransmit the data message 120 after a delay, or start the process over upon the next SR opportunity, or other action depending on network rules. In addition, some networks permit a short data message to be appended to the Msg3 110, but unfortunately the data message 120 is too long for that option in this case. Even when a short data message can be added to Msg3, the user device is still required to complete the registration steps, and then the grant steps, before transmitting another message.

The systems and methods include a network database (or listing or array or other collection of data) containing information about base stations, according to some embodiments. The network database may be publicly accessible. For example, the network database may be anonymously and/or freely downloadable from the Internet or other network. In other embodiments, the network database may be provided (or updated) on a fee basis. The network database may be built-in to a device (such as on read-only memory), or may be provided on plug-in cards, or otherwise available to user devices. The network database may be searchable by location, for example indicating the closest base station to a user device's location, a user device's future location, other user-specified or user-associated location, or other location without limit. The network database may be copied, such as by downloading from the Internet or other publicly available resources, or otherwise available as an off-line copy, and the copy may function as the original by being searchable by location and providing base station system information. The network database may be updated by the various base stations, or by their higher level network operators or system administrators, when parameters or other aspects of the base stations change. Mobile copies of the network database, whether pre-installed or recently downloaded, may be updated accordingly. If a parameter is known to be revised at a future time, the copy may include a change schedule and may automatically apply the update at the specified time. Portions of the network database, such as data for a local or regional area, or the entire database, may be downloaded and stored on a user device, such as a computer or a mobile phone or a vehicle, and the stored copy may be used to locate nearby base stations when the device is off-line or disconnected from networks. The network database may also provide system information about each base station, such as the identity of the base station, or the numerology or bandwidth or subcarrier spacing supported by each base station, or the frequencies of its channels, and various defaults or procedures or requirements. The network database may indicate whether each base station provides accommodation for reduced-capability user devices such as a low-complexity channel or simplified legacy procedures. The network database may also, or alternatively, indicate whether the base stations provide accommodation for high-performance devices and high-priority communications such as emergency messaging, and the like.

Embodiments of the network database may be searched according to criteria, such as base station locations, or the closest base station that accepts new entrants, or the closest base station that provides low-complexity procedures for reduced-capability users, or that provides a legacy technology channel for users that prefer it, or that provides high-speed or high-reliability or low-latency communications for users who need it, among other options. After consulting the network database to find the nearest available base station with the required properties, a wireless device may log on to the selected base station. The search, selection, and log-on procedures may be performed automatically and transparently to a human user.

Each base station may have its own section (or "entry") in the network database, and may revise its own information whenever parameters change, according to some embodiments. In other embodiments, a system administrator managing the base station may enter the changes for the base stations in its control. For example, a base station may transmit its planned changes to a qualified entity such as a network operator or system administrator responsible for that base station, and the qualified entity can then, or periodically, update the network database, which is then distributed in its updated form. To check that the change was installed correctly, the base station or entity can download a portion of the network database including the changed parameters, and compare to the intended values. In addition, if a parameter change is scheduled at a particular time, the change and the time may be added to the network database in advance, such as a change schedule, and the change may be automatically implemented at the scheduled time. The base station or the entity can check this by downloading the portion after the scheduled time. An intent of the network database may be to provide up-to-date network information, and especially the initial access information, to prospective user devices before they attempt to contact the base station.

In some embodiments, the network database may include static (not time-dependent) information. The network database may include the location (latitude and longitude or address or the like) of each base station or, preferably, of its antenna. In some embodiments, the network database may include system information about each base station. For example, the network database may include parameters normally contained in the SSB message, such as the cell identity, time indexes for scrambling, cell-barred flags, the position of demodulation signals in downlink messages, the SIB1 numerology and configuration (subcarrier spacing, bandwidth, frequency band, and the like), and/or the frequency offset of the SSB relative to the common resource grid of the base station. In some embodiments, the network database may include further static information that is normally provided in the SIB1 message, such as the schedule and frequencies of the random access channel(s), the numerology of the resource grid, the downlink search space(s), one or more CORESET (control resource set) used for detecting downlink messages, and/or a SI-RNTI (system information radio network temporary identification) for retrieving further system information. In some embodiments, the network database may include device-independent information such as that provided in the RAR (random access response) message, such as a default backoff parameter, the subcarrier spacing, and/or the random access size group. Thus embodiments of the network database may provide substantially the same static information contained in the SSB and SIM and other system messages.

In addition, the network database may provide timing information for each base station. For example, the network database may include an algorithm or formula by which a user device can determine the overall timing of the base station, such as the frame, subframe, slot, and/or symbol boundaries in time. The network database may indicate how the base station time-base is calibrated, such as by GPS or other navigation satellite signals, and a prospective user device may access that same time source to synchronize with the base station before attempting to receive the system information messages. In addition, the network database may include data on user accommodations offered by the base station, such as whether the base station can accommodate reduced-capability user devices, or provides alternate access options, or provides legacy channels, and their frequencies and bandwidths, among many other items of information that the prospective user device may find useful. Such other items of information will be apparent to one of ordinary skill in the art given this teaching.

An advantage of the network database may be to provide ways for a user device to find, identify, connect with, become registered on, and transmit messages to a base station with less complexity than previously required. Another advantage may be to enable prospective user devices to select an appropriate base station according to proximity, and to obtain system information about that base station before contacting the base station, and thereby to avoid the blind search and many other steps and delays involved in prior-art procedures for initial access. Another advantage may be to enable low-cost, low-performance, low-demand user devices, such as those based on simple microcontrollers for example, to access 5G and 6G networks. Another advantage may be to better serve user devices that do not require the full speed and performance of 5G or 6G, as well as those that do require it. Another advantage may be to accommodate reduced-capability devices without burdening the base station or drawing significant resources from other user devices that depend on high performance communications. Another advantage may be to provide procedures that may enable both high-performance and reduced-capability user devices to reduce energy consumption, improve calculation efficiency, avoid delays, and generally enhance user satisfaction throughout the network, according to some embodiments. Particular embodiments may include one, some, or none of the above-mentioned advantages. Other advantages will be apparent to one of ordinary skill in the art, given this teaching.

Figure 2A:
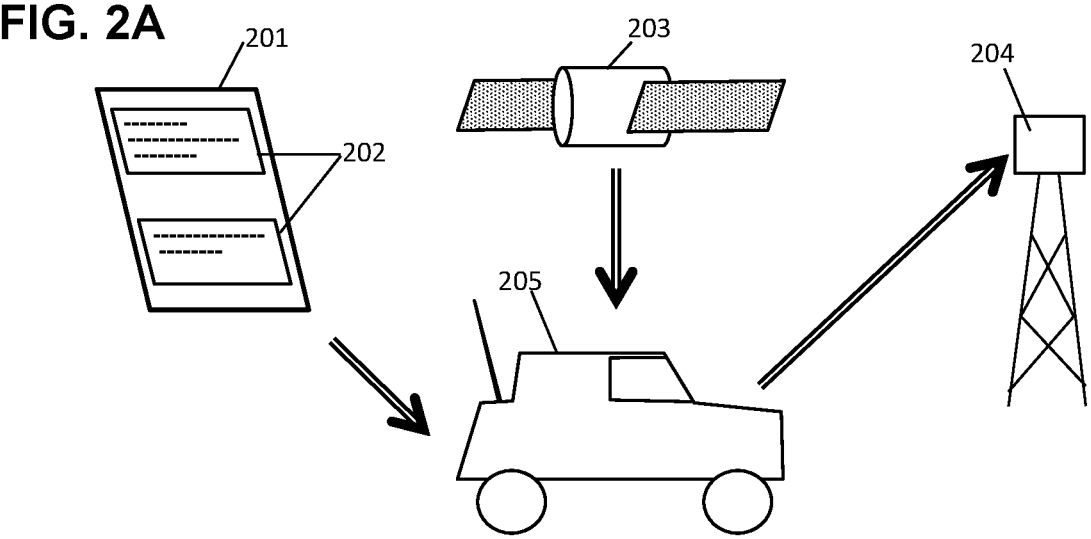
FIG. 2A is a schematic sketch showing an exemplary embodiment of a mobile user in communication with a network database and other items, according to some embodiments.

FIG. 2A is a schematic showing an exemplary embodiment of a network database, according to some embodiments. As depicted in this non-limiting example, the network database is depicted schematically as a page 201 on which two entries 202 are shown, each entry 202 associated with one base station respectively. (The figure is highly schematic. The actual network database is envisioned as a digital electronic file, not a written page, unless someone chooses to print out a portion.) As an electronic file, the network database may be used on-line when connected, and also may be downloaded and used off-line, for example by automatic or automated electronics, for selecting and connecting to a base station. Also shown are a satellite 203 such as a GPS satellite, a base station antenna 204, and a user device depicted as a vehicle 205. Arrows indicate information flow. The user device 205 first determines its location using GPS or other global navigational satellite system, or alternatively using a map (such as a stored electronic map), or using an address such as an address of a building close to the user device 205, or otherwise determines its location. Then the user device 205 may search the network database 201 to identify one or more available base stations close to the user device's location. The user device 205 may also determine the frequency and bandwidth and numerology of the base station's entry channel (usually a broadcast channel or a random access channel) from the database copy. The user device 205 may then proceed to receive the periodic SSB message on the broadcast channel without blind searching. Alternatively, and even more preferably, the user device 205 may obtain the content of the SSB and SIB1 messages directly from the network database 201 without having to search for those messages. After obtaining the system information by consulting the network database 201, the user device 205 may transmit a preamble message directly on the random access channel, thereby initiating entry into the base station's network while bypassing many of the steps of FIG. 1.

Figure 2B:
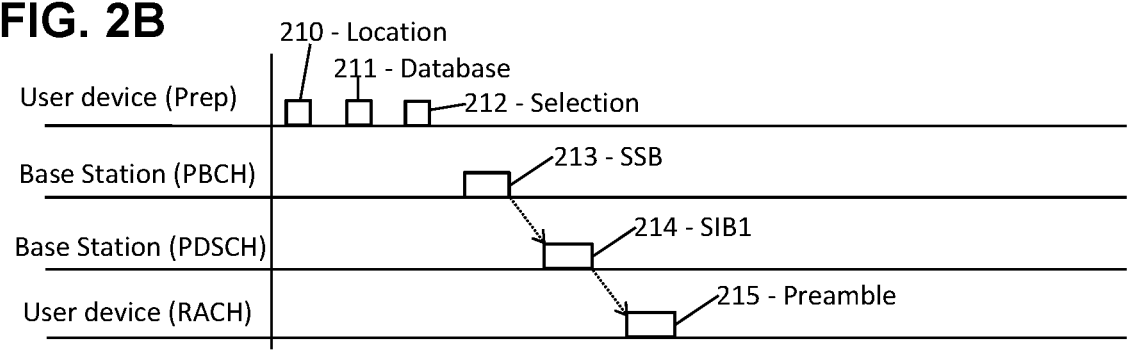
FIG. 2B is a sequence chart showing an exemplary embodiment of a process for a user device to obtain system information, according to some embodiments.

FIG. 2B is a sequence chart showing an exemplary embodiment of a low-complexity procedure for acquiring system information, according to some embodiments. Time is shown horizontally, and lines indicate actions of the user device and base station. As depicted in this non-limiting example, the user device performs a series of preparatory actions (Prep) including determining its own location 210 using, for example, an address or a map or a satellite signal such as GPS. Then the user device checks the network database 211 (or a portable copy thereof) and thereby finds a base station close enough to serve the user device. Software may facilitate the search, for example by selecting 212 only base stations that are within a certain distance and are accepting new entrants, and which provide options compatible with the user device's capabilities such as a low-complexity channel. In addition, high-performance devices and users demanding high quality of service may use the network database to save time and resources, by selecting the base station and obtaining the system information before making contact. The software may then present the choices graphically for a human user to select, or (more preferably) may automatically select the nearest compatible base station and initiate contact, transparently to the human user. (In many envisioned applications, such as industrial sensors and the like, there is no human involvement at all, and the user device is expected to make all the decisions autonomously. Low-complexity procedures may be essential to the success of such applications.) The user device may then obtain system information from the network database about the selected base station, such as frequencies and bandwidths and other parameters of the base station's broadcast channel, among other data. Then the user device may attempt to receive the SSB message 213 by receiving and processing signals on the indicated channel. The user device may determine, from the SSB message, the frequency and parameters of the base station's downlink shared channel, and may receive the SIB1 message 214, which provides the frequency and parameters of the preferred random access channel, thereby enabling the user device to transmit a preamble message 215 on that frequency, which initiates a cell joining procedure. Notably, the user device did not perform a blind search around the frequency raster, but rather determined the appropriate broadcast channel frequency and other parameters directly from the network database 211.

In another embodiment, the network database may provide the system information that the user device needs to register on the network, instead of waiting for the SSB and SIB1 messages. With that system information, the user device may thereby pass directly to the preamble stage on the random access channel, and initiate access. The user device may adjust its timing and frequency by detecting a message on the random access channel before transmitting the preamble 215, thereby making it easier for the base station to receive the preamble. If the database indicates how the base station sets its time-base, the user device may be able to access the same source and thereby synchronize with the base station before receiving a message or transmitting a message to the base station. As another alternative, the user device may transmit the preamble 215 at a random time, since most base stations are capable of receiving out-of-synchronization messages on their random access channels, and can then provide a timing adjustment and frequency adjustment message to bring the user device into compliance with the base station's resource grid.

Figure 2C:
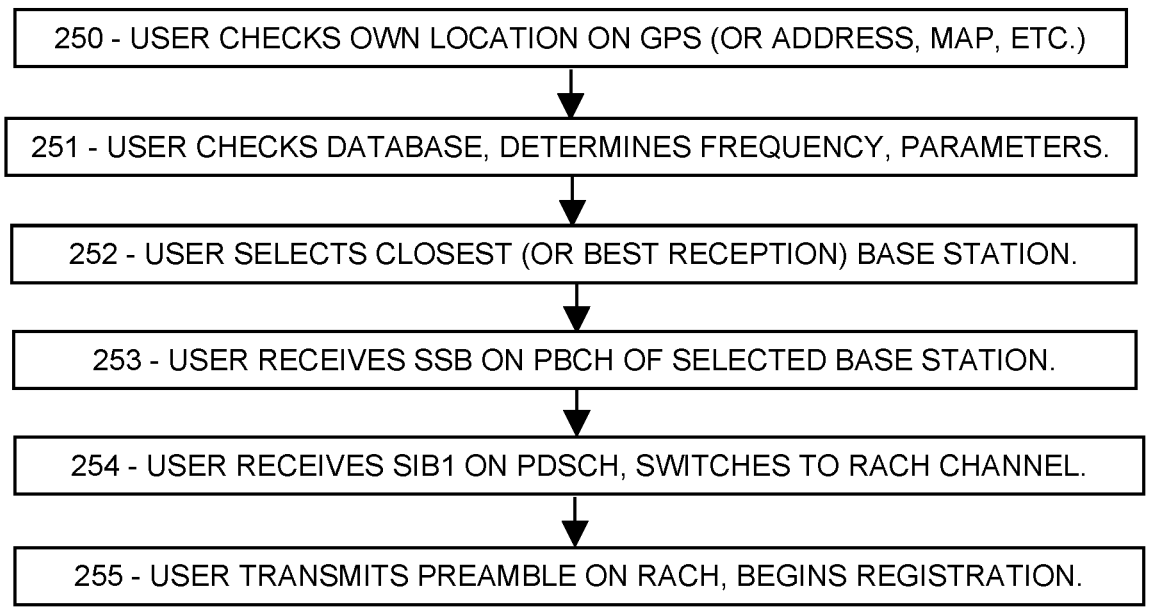
FIG. 2C is a flowchart showing an exemplary embodiment of a process for a user device to obtain system information, according to some embodiments.

FIG. 2C is a flowchart showing an exemplary embodiment of a low-complexity procedure for a user device to find a proximate base station, according to some embodiments. These low-complexity procedures may also be beneficially employed by a high-performance device, or other wireless devices in general. As depicted in this non-limiting example, at 250, a user device determines its own location using GPS or other satellite system, or using a map, or using a nearby address, or otherwise. Then at 251, the user device checks a network database, using the Internet or a stored copy for example, and finds one or more proximate data bases, and determines their signaling parameters and availability for new entrants, among other information. At 252, the user device selects one of the base stations, in this case selecting on the basis of distance, availability, and accommodation for high-speed, high-performance communications. At 253, the user device locks on to a PBCH frequency listed in the network database and subsequently receives an SSB message indicating system access information. At 254, the user device finds the PDSCH and receives the SIB1 message. At 255, the user device begins the registration procedure on the selected base station by transmitting a preamble on a random access channel.

As mentioned, the user device may download the base station information in advance, such as before a trip has started. The user device may download the entire database and search through it later, or it may copy just a regional portion of the database if the itinerary is known. Then, using the stored copy while off-line, the user device can access the base station information independently when needed. In addition, the user device may acquire the base station's system information from the network database, such as information normally provided in the SSB and SIM messages. With that information, the user device may transmit a preamble message on the random access channel. Such messages may be termed in some instances random-access preamble messages. Notably, the user device may have avoided searching for those system information messages, a significant savings in time and complexity An advantage of determining the frequency and bandwidth of the SSB message deterministically from the network database, before attempting to receive it, may be that the hunt-and-peck or blind-search scanning may be avoided. In addition, the procedure uncertainty may be reduced, and time may be saved. An advantage of looking up the broadcast channel frequency in the network database may be speed and simplicity at finding and connecting with a suitable base station, relative to a blind search through multiple possible frequencies. Another advantage may be that the depicted low-complexity procedures may be compatible with devices that may have difficulty complying with prior-art registration procedures. Alternatively, a high-performance user device may also benefit from using the network database, by avoiding delays and retrieving system information from the database instead of wirelessly.

Another advantage may be that the procedures of FIG. 2A or 2B or 2C may be implemented as a software (or firmware) update, without requiring new hardware development, and therefore may be implemented at low cost, according to some embodiments. The procedures of FIG. 2A or 2B or 2C may be implemented as a system or apparatus, a method, or instructions in non-transient computer-readable media for causing a computing environment, such as a user device, a base station, or other signally coupled component of a wireless network, to implement the procedure. Other advantages may be apparent to one of ordinary skill in the art, given this teaching. The advantages listed in this paragraph are also true for other lists of advantages presented for other embodiments described below.

Figure 3A:
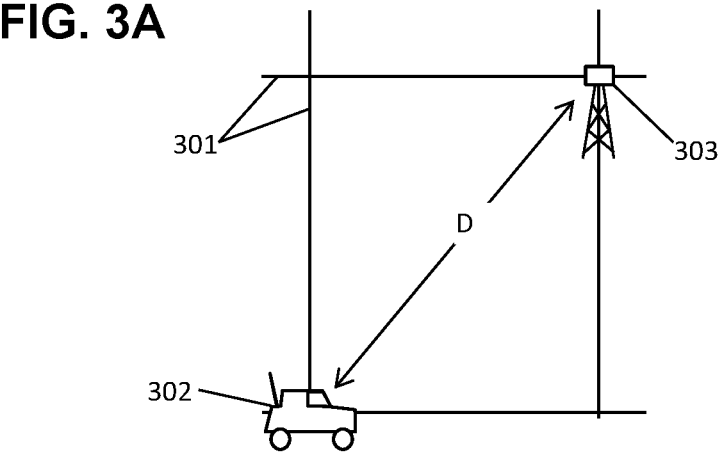
FIG. 3A is a schematic sketch showing an exemplary embodiment of a mobile user in communication with a base station at distance D, according to some embodiments.

FIG. 3A is a schematic showing an exemplary embodiment of a low-complexity procedure for calculating a distance between a prospective user device and a base station, and using that distance to apply temporal and/or power level corrections to a wireless transmission, according to some embodiments. As depicted in this non-limiting example, the locations of the user and the base station may be measured in any suitable units, such as latitude and longitude lines 301 shown schematically in the figure. The distance D between a prospective user device 302 (rendered as a vehicle) and a base station 303 (rendered as an antenna), may be calculated from the difference between their respective locations, for example. Knowing the distance D, and the speed of light, the user device 302 can calculate an elapsed time for its transmissions to reach the base station 303, or equivalently for the base station's transmissions to reach the user device 302. The user device 302 can then adjust its transmission timing relative to the base station's transmissions, and may thereby cause its transmissions to arrive at the base station 303 at the proper time, such as at a slot boundary or at a particular symbol time within a slot. To do so, the user device 302 may note when a base station's transmission first reaches the user device 302. The user device 302 can then adjust the timing of its own transmission relative to that time, by advancing its own transmission by a time equal to twice the calculated travel time, relative to the received time, and may thereby cause its own message to reach the base station 303 at the expected symbol time. The user device, by advancing its transmission time by twice the calculated signal travel time, may thereby account for the base station's transmission travel time as well as the travel time of the user device's transmission, and may thereby cause the uplink transmission to arrive at a particular time, as desired.

In another embodiment, the user device 302 may adjust its transmission power so that the uplink signal will arrive at the base station 303 with a prescribed amplitude level. To do so, the user device 302 may calculate an attenuation factor related to the distance D, and may adjust its transmission accordingly. For example, the adjustment may account for the lateral spreading of the user device's emitted electromagnetic wave, depending on the antenna properties of the user device 302. The adjustment may also account for the frequency-dependent absorption of the signal in the atmosphere across the distance D. The user device 302 may then adjust its emitted wave amplitude to compensate for those attenuation factors.

An advantage of calculating the distance between the prospective user device 302 and the base station 303 may be that the user device 302 may then select the closest base station 303 from a plurality of possible base stations, and may thereby obtain the best reception. Another advantage may be that the user device 302 may adjust the timing of its transmissions to compensate for travel time so that the user device's transmissions arrive at the base station 303 at a predetermined time. Another advantage may be that the user device 302 may calculate an attenuation factor based on the distance, and may correct the transmission power to compensate, so that the user device's signal will arrive at the base station 303 with the expected amplitude at the proper time.

Figure 3B:
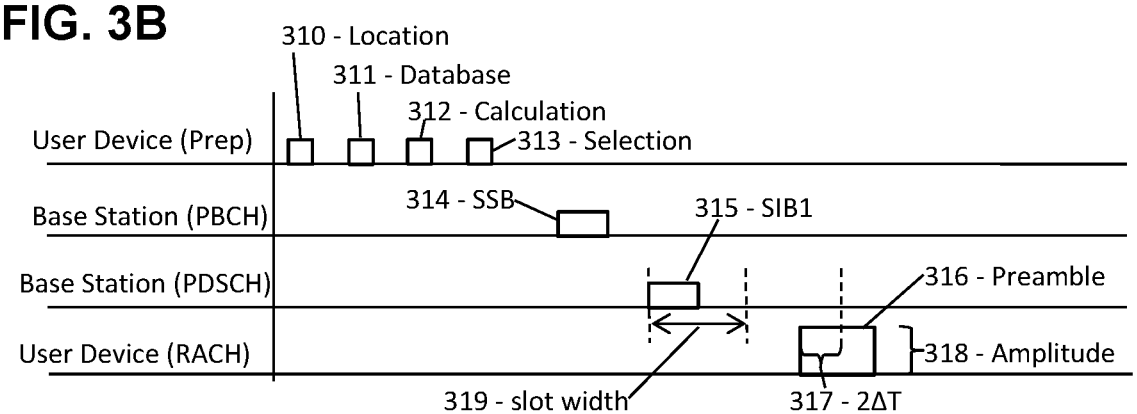
FIG. 3B is a sequence chart showing an exemplary embodiment of a process for a user device to apply a distance correction, according to some embodiments.

FIG. 3B is a sequence chart showing an exemplary embodiment of a low-complexity procedure for adjusting a wireless message timing and/or amplitude, according to some embodiments. As depicted in this non-limiting example, a prospective user device may first perform certain preparations (Prep) including determining its own location 310 (using a map, or an address, or a satellite-based navigation system, or by a "dead-reckoning" calculation relative to a starting location, among other means). The user device may also determine the location of a base station 311 using, for example, a network database containing base station data. The user device may then calculate 312 a distance between the user device location and the base station location. The user device may then select 313 which base station, of a plurality of available base stations, to contact according to the distance, such as selecting the closest available base station. The user device may then detect a transmission 314 from the base station, such as an SSB message transmitted on the PBCH, and then an SIB1 message 315 on the PDSCH. The user device may note a time at which the message 314 or 315 was received, and may calculate a time adjustment equal to twice the calculated travel time of the signal traveling the distance between the base station and the user device. The user device may also calculate an attenuation factor based on the expected absorption and spreading of its transmissions in traversing the same distance.

The user device may determine the slot width 319 according to the messages 314 or 315, and may then adjust its own transmission timing by advancing by an amount 2ΔT (317) where ΔT is the calculated one-way travel time of the signal. The user device may also adjust its transmitter power to compensate for the calculated attenuation. The user device may then transmit a random access preamble 316 on the random access channel with the adjusted amplitude 318 as shown.

The user device may also determine the frequency of the base station's broadcast channel, on which the base station transmits the SSB message 314, from the network database. The network database may also indicate the slot width 319, the position of the SSB message 314 in a slot, and the expected position of the preamble 316 in a slot, so that the user device can calculate the time advance 317 accordingly. By applying the calculated time advance 317, the user device may thereby cause the preamble message 316 to arrive at the base station at the time expected, such as during a random access channel "window" when the base station expects such random access messages.

The network database may also indicate the expected amplitude of the preamble message 316 at the base station. The user device can then calculate how much power to apply in transmitting the preamble message 316, as indicated in the amplitude 318 of its message.

An advantage of adjusting the timing of a message according to the calculated distance between the user device and the base station may be that the message may thereby arrive at the base station at a particular time, such as a particular symbol within a slot, at which the base station expects to receive such messages. An advantage of adjusting the amplitude of a message according to the distance may be that the message may thereby be caused to arrive at the base station with a particular received amplitude, which the base station expects to receive.

Figure 3C:
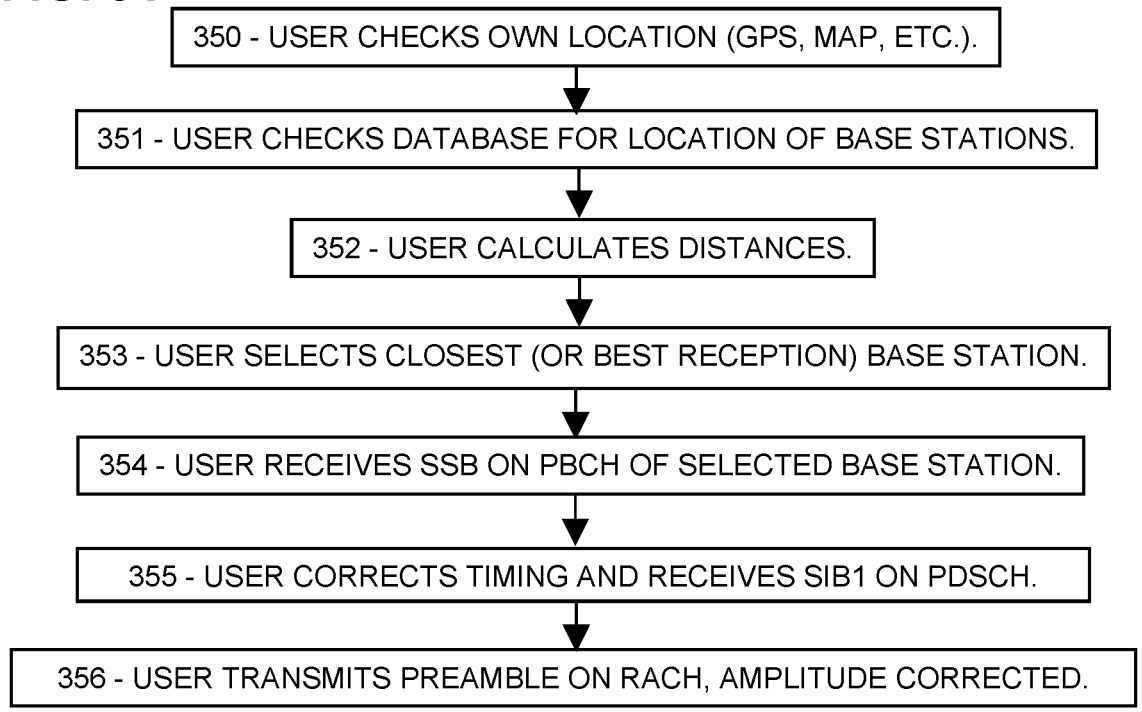
FIG. 3C is a flowchart showing an exemplary embodiment of a process for a user device to apply a distance correction, according to some embodiments.

FIG. 3C is a flowchart showing an exemplary embodiment of a low-complexity procedure for correcting a message timing and/or amplitude based on a distance between the transmitter and receiver, according to some embodiments. As depicted in this non-limiting example, at 350, the user device determines its own location using, for example, a satellite system such as GPS, a map which may be an electronic map, an address proximate to the user device, or other suitable means for determining location. At 351, the user device reads or consults a network database of base station data (or a copy or a portion thereof), and determines the locations of base stations near the user device and, at 352, calculates distances to the various near base stations and, at 353, selects whichever base station is the closest, or otherwise is expected to provide the best reception. The user device also determines, from the network database, the frequency of the selected base station's broadcast channel and receives an SSB message at 354. This message also establishes the timing of the base station's resource grid, retarded by the travel time of the SSB across the distance to the user device. At 355, the user device corrects its own time-base to compensate for the received message timing and then receives the SIB1 message on the downlink shared channel. (Alternatively, the user device may acquire the system information, including that normally provided in the SSB and SIB1 messages, directly from the network database, if provided.) Then at 356, the user device transmits a preamble message on a random access channel, as discovered from the SIB1 message or the network database, with the transmission timing advanced to compensate for the two-way travel time of the SSB and preamble messages, so that the preamble message will arrive at the base station at an expected time (such as an expected symbol within a slot). In addition, the user device may adjust the transmission power of the preamble message so that it will arrive at the base station with a predetermined amplitude, by compensating for distance-dependent factors such as the atmospheric absorption and the beam spreading.

An advantage of performing the timing and/or amplitude adjustments may be that the base station may receive the preamble message with a timing and an amplitude matching, or more nearly matching, the expected timing and amplitude, and thereby simplifying the reception and demodulation of the preamble message, and potentially avoiding message faults due to, for example, inter-symbol interference. Another advantage may be that several time-consuming steps, such as power-ramping (repeatedly transmitting the same message at successively higher power levels) may be avoided. Another advantage may be that the depicted low-complexity procedures may be compatible with devices that may have difficulty complying with prior-art registration procedures. Another advantage may be that high-performance devices, or emergency devices with high-priority messages to transmit, may access the network more rapidly using the network database than by searching for system information messages.

Figure 4A:
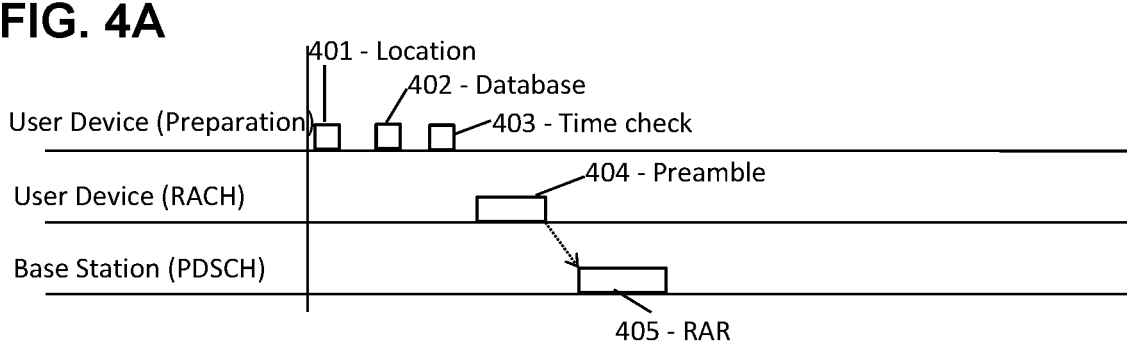
FIG. 4A is a sequence chart showing an exemplary embodiment of a process for a user device to become registered on a network, according to some embodiments.

FIG. 4A is a sequence chart showing an exemplary embodiment of a low-complexity procedure for adjusting a message timing using an external time standard, according to some embodiments. Time is shown horizontally, and actions of a user device are shown on the first line, transmissions of the user device on the second line, and transmissions of the base station on the third line. As depicted in this non-limiting example, the user device first determines its own location 401 using, for example, GPS or other satellite-based navigation system, or other location means. The user device then, if not sooner, consults a network database 402 containing information about the system parameters of base stations, and selects a base station. The user device thereby determines, among other things, the timing of the selected base station's resource grid, such as the absolute times at which slot boundaries and frame boundaries and the like are to occur, relative to the base station's local clock. For example, the network database may include a formula or algorithm indicating the frame boundary schedule. The network database may also indicate how the base station calibrates its clock, such as by GPS timing, WWV reception, or otherwise. The user device may then at 403 calibrate its own clock in the same way, and may thereby synchronize to the base station. (Additional corrections may also be applied based on signal travel times and the like.)

The user device may then transmit a preamble message 404 on the random access channel, initiating contact with the base station. Note that the user device has bypassed the blind search phase and the SSB reception and the SIB1 reception. Instead, the user device has obtained, from the network database, the fixed parameters that those messages normally provide, and has obtained the timing schedule (such as frame and symbol timing) by locking to the same time standard as the base station and calculated the timing schedule according to a formula or the like. Hence the user device has collected the information of the system information messages independently, including both static and time-dependent parameters, and is ready to initiate contact without further delay.

The base station then receives the preamble and transmits a RAR (random access response) reply 405, which may include a fine-adjustment for timing and/or power of subsequent messages from the user device. The base station may not know, or care, whether the user device has obtained the system information and timing from the system messages or from the network database, so long as the preamble message 404 is received at the proper format, frequency, and time.

Figure 4B:
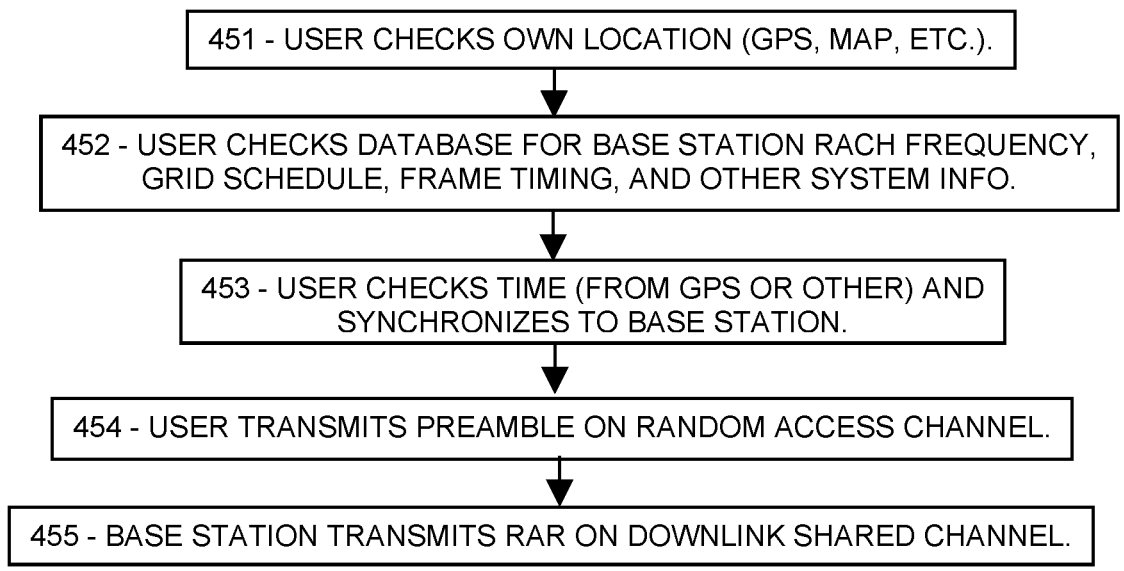
FIG. 4B is a flowchart showing an exemplary embodiment of a process for a user device to become registered on a network, according to some embodiments.

FIG. 4B is a flowchart showing an exemplary embodiment of a low-complexity procedure for a user device to contact a base station, according to some embodiments. As depicted in this non-limiting example, the user device determines time using an external time standard, and thereby synchronizes with the base station's resource grid before contacting the base station. At 451, the user device determines its own location using, for example, GPS or other satellite system, or using a map or address or the like. At 452, the user device consults the network database of base station information, which in this example, includes both static and time-related parameters. For example, the network database may include a formula that indicates the absolute times of frame boundaries according to the system clock. The formula may be sufficient to determine other time demarcations such as subframe, slot, and symbol boundaries. The network database may also indicate how the base station's (or core network's) time-base is regulated. In some embodiments, the network locks to an external precision standard such as GPS time signals or WWV signals, for example. Then 453 the user device may calibrate its own clock to the same time standard, and may thereby synchronize to the base station's time-base. (Alternatively, the user device may synchronize to the base station by detecting a message from the base station.) In some embodiments, the synchronization may be sufficiently accurate that the initial contact message from the user device to the base station can be interpreted unambiguously, in the same way that scheduled messages in the network are interpreted. More specifically, the user device may synchronize to an accuracy of better than the cyclic prefix of the OFDM (orthogonal frequency-division multiplexing) symbols of uplink messages, which is a few microseconds for a subcarrier spacing of 15 or 30 kHz. In that case, the message symbols retain mutual orthogonality, which may thereby assist the base station receiver in interpreting the message.

With knowledge of the static network parameters, from the network database, and with clock synchronization to the base station, at 454 the user device may transmit a preamble message on the random access channel, after which 455 the base station may transmit an RAR message providing a temporary identification code, and also fine-adjustment suggestions regarding power and timing, and further system information needed for completing the registration.

An advantage of synchronizing to the same time standard as the base station may be that the user device may thereby avoid delays involved with receiving the timing and synchronization data from the system messages SSB and SIB1. Another advantage may be that the user device may arrange that the preamble message arrives at the base station when expected (during a random access interval, and aligned with the base station's resource grid, for example), which may avoid message faults and the like. Another advantage may be simplicity, since many low-cost microcontrollers can receive and process GPS messages natively, and can search an internally-stored file such as the network database, and can thereby provide the preamble message with the timing expected. An advantage of synchronizing the user device to the base station and collecting system information from the network database, may be that the user device can then begin communicating with the base station without searching for the SSB message and the SIB1 message. Another advantage may be that the depicted low-complexity procedures may be compatible with devices that may have difficulty complying with prior-art registration procedures. Alternatively, the procedures may enable high-performance devices to access network communications faster than searching for the system information messages.

Figure 5A:
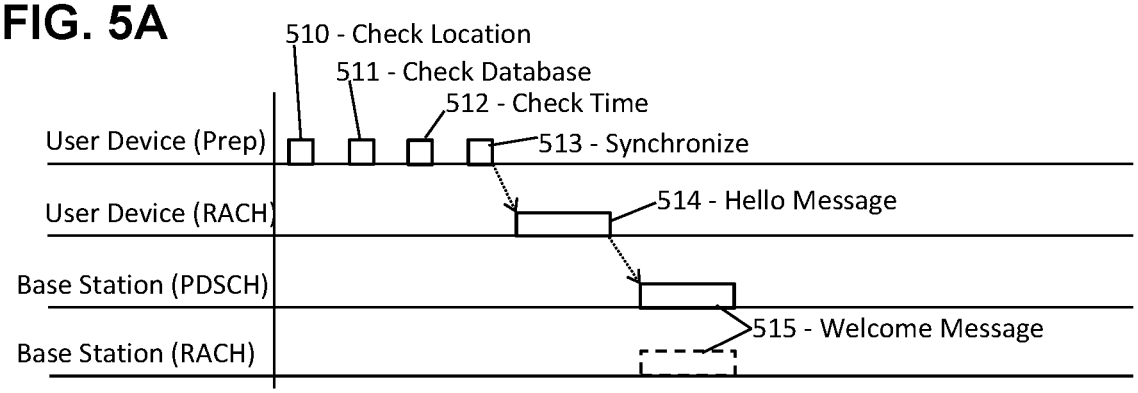
FIG. 5A is a sequence chart showing an exemplary embodiment of a process for a user device to become registered on a network using database information, according to some embodiments.

FIG. 5A is a sequence chart showing an exemplary embodiment of a low-complexity procedure for registering on a wireless network, according to some embodiments. As depicted in this non-limiting example, the user device acquires system information and time synchrony before contacting the base station, and bypasses the prior-art access messaging. User device actions are shown on the first line, user device messages on the random access channel, base station messages on the downlink shared channel, and base station messages on the random access channel. The user device checks its own location 510 using a satellite navigation system or a terrestrial means such as a map. The user device then, using a network database 511, selects a proximate base station and obtains static parameters of that base station. Then (if not sooner) the user device checks the time 512 using GPS time signals or other external time standard, preferably the same standard that the base station uses to control its system clock. The user device uses the time calibration with the static parameters to synchronize 513 with the base station's resource grid (frame, subframe, slot, and symbol boundaries as well as subcarrier frequencies and various channel frequencies, for example). At that point, the user device may have acquired information contained in the system messages SSB and SIB1, as well as the RAR (Msg2) message, other than the device-specific parameters such as its temporary identification code TC-RNTI.

The user device may then transmit a "hello message" 514 on the random access channel. The hello message 514 may serve the same role as a MsgA message (which combines the preamble with Msg3) in an abbreviated registration sequence. In addition to the MsgA content, the hello message 514 may further include information such as the capabilities and QoS (quality of service) requirements of the user device, as discussed below. The hello message 514 may include fields or flags indicating that the user device has obtained system information from a network database rather than from SSB and SIB1 messages, so that the base station may inform the user device of any recent changes. The hello message 514 may also request that the base station reply on the random access channel, and/or request other concessions due to the user device's limitations. In response to the hello message 514, the base station may transmit a "welcome message" 515 on the downlink shared channel or (in dash) on the same random access channel as the hello message 514 if requested. The welcome message may serve the same purpose as the MsgB (that is, the RAR and Msg4 combined) of the abbreviated registration procedure, or it may contain further information that the user device requires.

Figure 5B:
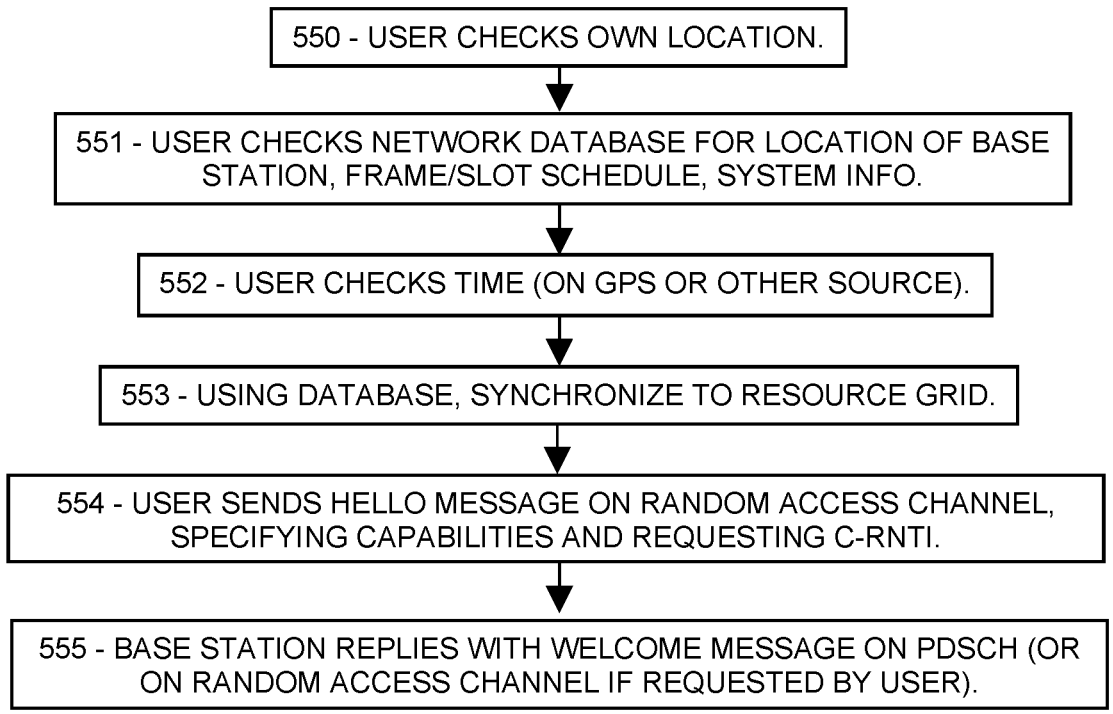
FIG. 5B is a flowchart showing an exemplary embodiment of a process for a user device to become registered on a network using database information, according to some embodiments.

FIG. 5B is a flowchart showing an exemplary embodiment of a low-complexity procedure for a user device to register with a base station, according to some embodiments. As depicted in this non-limiting example, at 550, the user device finds its own location using, for example, GPS or a map etc. At 551, the user device checks a network database to find a suitable base station and determine its system parameters, including information about the timing of its resource grid. At 552, the user device synchronizes its system clock to an external time standard such as GPS, selecting the same standard as the base station uses for its clock, and thereby synchronizes to the base station timebase at 553. The user device may thereby configure its messages to comply with the timing requirements of the base station. In addition, not shown, the user device may apply a distance-based timing advance to compensate for the calculated travel time of the message signal from the user device location to the base station location, as mentioned above. At 554, the user device transmits an introductory message such as a preamble or a hello message containing information about the user device and requesting entry into the network. At 555, the base station replies with a response message such as a RAR or a welcome message containing additional system information, an identification code, and the like. The welcome message may be transmitted on the downlink shared channel or the random access channel, depending on a user request contained in the hello message, for example.

An advantage of obtaining system parameters from the network database, and synchronizing to the base station using an external time standard, may be that the user device may then communicate with the network without performing the prior-art registration steps of blind searching, waiting for, and receiving a sequence of messages, that is, more quickly and with fewer steps than prior art 5G and 6G protocols. Another advantage may be that certain embodiments of the user device, which may have difficulty carrying out the prior-art procedures, may be able to perform the depicted steps. An advantage of transmitting and receiving messages on the random access may be that user devices may more easily transmit and receive on the same frequency. Another advantage may be that the hello and welcome messages may include information about the user device and/or about the network that are not included or not accommodated in the prior-art 4-step or 2-step access procedures, such as indicating that the user device would prefer to remain communicating on the random access channel (or other channel allocated for such communication). Another advantage may be that the depicted procedures may be performed by a low-cost or reduced-capability user device as well as a full-performance or high-priority device.

Figure 6A:
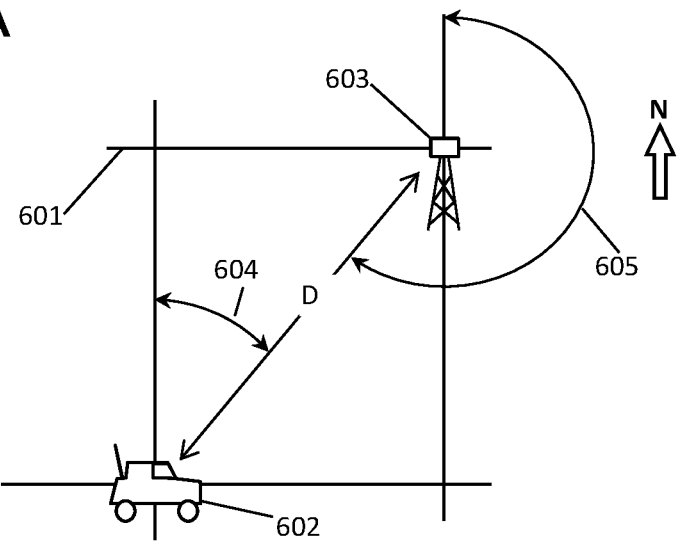
FIG. 6A is a schematic sketch showing an exemplary embodiment of a mobile user calculating an angle toward a base station, according to some embodiments.

FIG. 6A is a schematic showing an exemplary embodiment of a low-complexity procedure for a user device to assist a base station in aligning a wireless signal beam, according to some embodiments. As depicted in this non-limiting example, the user device 602 determines its location in, for example, latitude and longitude 601, and also determines the location of a base station 603 using a network database, and thereby calculates an angle θ 604 between the two entities. The user device 602 then transmits a message to the base station indicating the angle θ 604, or the base station's angle (θ+180 degrees) 605, or the user device's coordinates 601 depending on convention, for example. The base station 603 can then cause its antenna to direct an electromagnetic beam toward the user device 602 for improved reception of downlink messages and reduced interference of other user devices not directly in that beam. In addition, if the user device 602 has a beamforming capability and an electronic compass, it may direct the uplink beam toward the base station 603 in the same way.

Figure 6B:
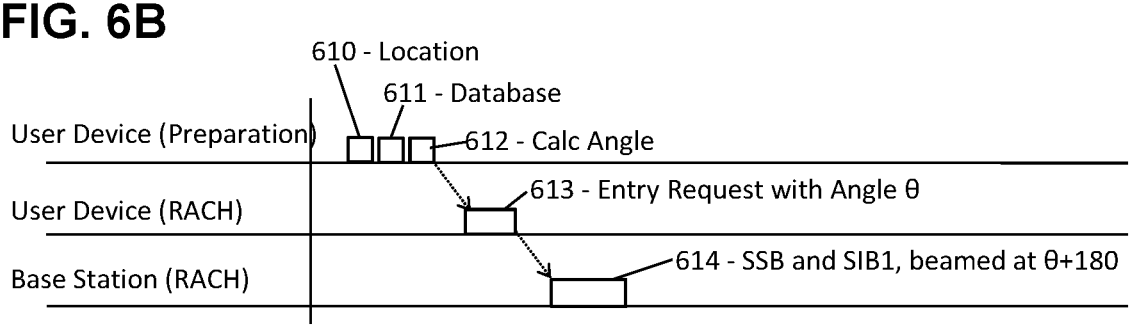
FIG. 6B is a sequence chart showing an exemplary embodiment of a process for a user device to calculate an angle toward a base station, according to some embodiments.

FIG. 6B is a sequence chart showing an exemplary embodiment of a low-complexity procedure for a user device to assist a base station in aligning a beam toward the user device, according to some embodiments. As depicted in this non-limiting example, the first line shows preparatory actions of the user device, the second line shows user device messages on the random access channel, and the third line shows base station messages on the random access channel. Also, in this example, the base station transmits its SSB message when prompted by the new user device.

First, the user device determines its own location 610 using, for example, a satellite navigation system, or by other suitable means. Then (if not sooner) the user device retrieves system information from a network database 611 specifying base stations proximate to the user device, and then selects one. The user device then calculates an angle θ 612 between itself and the base station according to the base station's coordinates as reported in the network database 611. The network database 611 may also provide the frequency and timing of that base station's random access channel. The user device then initiates communication with the base station by transmitting an "entry request" message 613 on the random access channel. The entry request message 613 may include information about the user device and the angle θ 613, or the base station's angle toward the user device, θ+180 degrees (modulo 360), or the coordinates of the user device, in various embodiments. The entry request message 613 may include a request for a unicast transmission of the SSB and SIB1 messages, if the user device has not obtained that information from the network database. The base station replies with a combined SSB and SIB1 message 614 which is beamed toward the user device as requested.

In the depicted example, the system information message 614 is transmitted in response to the entry request message 613, rather than continuously or periodically, since this system information message 614 is beamed narrowly toward the user device that requested it. In some embodiments, the base station may include, in the SSB message or appended to it, a timing correction message and/or a power adjustment message, to bring the user device's transmissions into compliance with the timing and amplitude requirements of the base station. In some embodiments, the base station may include or append the contents of an RAR message, including a C-RNTI identification code, with which the user device can finish the registration process, thereby avoiding most of the steps and delays shown in FIG. 1.

Figure 6C:
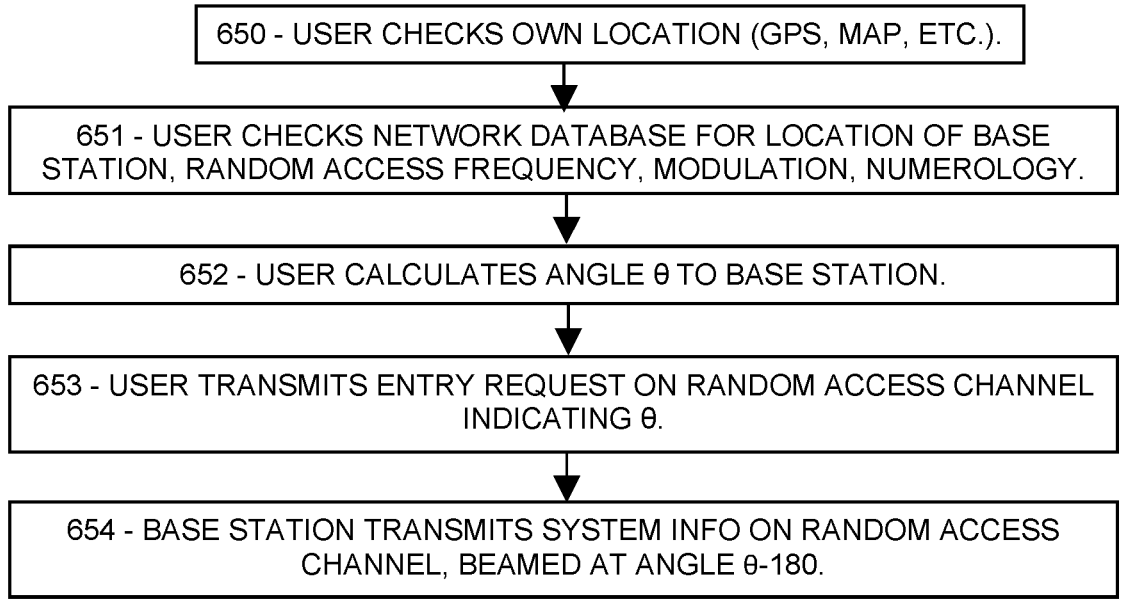
FIG. 6C is a flowchart showing an exemplary embodiment of a process for a user device to calculate an angle toward a base station, according to some embodiments.

FIG. 6C is a flowchart showing an exemplary embodiment of a low-complexity procedure for transmitting beamed messages, according to some embodiments. As depicted in this non-limiting example, at 650, a user device checks its own location using, for example, a satellite navigation system or a map, etc. At 651, the user device uses a network database to determine the locations of nearby base stations and selects one of them, such as the nearest open base station. The user device also retrieves system information from the network database such as the frequency and modulation of the base station's random access channel and other parameters generally included in the SSB and SIB1 messages. At 652, the user device uses the location information to calculate an angle θ of a vector from the user device toward the selected base station, relative to a fixed direction such as north. At 653, the user device transmits an entry request message to the base station, in this case on the random access channel since the user device has not yet received an uplink grant. (Alternatively, the user may transmit the entry request message on another channel allocated for initial contact other than random access preambles. The network database may indicate the preferred frequency and timing.) In the entry request message, the user device may specify the angle, or the angle plus 180 degrees (modulo 360), and/or the user device's location (such as latitude and longitude). The user device may also request system information in the message, if it has not already obtained the system parameters from the network database. If the user device is capable of beamforming, and knows the direction of north, then the user device may beam the request message toward the base station; otherwise, the request message may be transmitted isotropically. At 654, responsive to the request message, the base station transmits a beamed message containing system information (if requested) toward the user device according to the angle (or the coordinates) included in the request message. The user device and the base station may then proceed to complete the registration using beamed messages where appropriate, such as unicast beamformed downlink and optionally uplink messages.

An advantage of determining the locations of the user device and the base station may be that the vectorial angle between them can be calculated, by either the user device or the base station, or both. An advantage of calculating the angle between the user device and base station locations may be that messages may be transmitted in beams directed toward the receiving entity, thereby enhancing reception, saving energy, and reducing interference with other user devices. Another advantage may be that the beams may be oriented without expending the time and resources and energy consumption involved in beam scanning, that is, without transmitting multiple sequential signals in different directions to determine which direction best reaches the user device. Likewise, an advantage may be that the user device may direct a transmission or reception beam toward the base station without scanning, if the user device is configured for beamforming. Another advantage may be that the user device may transmit its first contact message to the base station using such an uplink beam, and may thereby obtain higher reliability and/or less energy consumption than transmitting isotropically, and likewise the base station may beam the initial registration messages toward the user device without having to wait for a later opportunity, or alternatively without having to repeatedly transmit system messages such as the SSB message in different directions.

An advantage of transmitting system information, such as the SSB and SIB1 messages, on-demand rather than continuously or periodically, may be that energy and resources may be saved. An advantage of transmitting the system information in a beam, rather than isotropically, may be that potential interference with other nodes may be avoided. Another advantage may be reduced delays and reduced time wastage, since the system information message may be transmitted substantially without delay following the request (aside from a necessary interval to allow the user device to switch from transmission to reception) whereas a periodically transmitted message generally involves a much longer delay for reception, such as 20 milliseconds for standard SSB messages and 160 milliseconds for the SIB 1.

An advantage of providing the system information in the network database may be to avoid most of the steps and delays involved in the prior art entry processes. However, if the system information is not provided in the network database, an advantage of transmitting the requested system information on the random access channel, rather than on broadcast or scheduled channels, may be that congestion on the other channels may be avoided. Another advantage may be that low-cost or reduced-capability user devices may receive the system information more easily when provided on the same frequency as the request message, rather than having to change frequencies between transmission and reception. Another advantage may be that the depicted low-complexity procedures may be compatible with devices that may have difficulty complying with prior-art registration procedures.

An advantage of steering beams based on location data, rather than by blind-search scanning, may be saving time and energy, since the initial beamed transmission may be directed toward the intended recipient from the start, without scanning. Additionally, feedback messages (such as reporting the reception quality, corresponding to the scanning) would not be required. Moreover, the other user devices are spared the background and potential interference caused by the beam-scanning and feedback messages.

Figure 7:
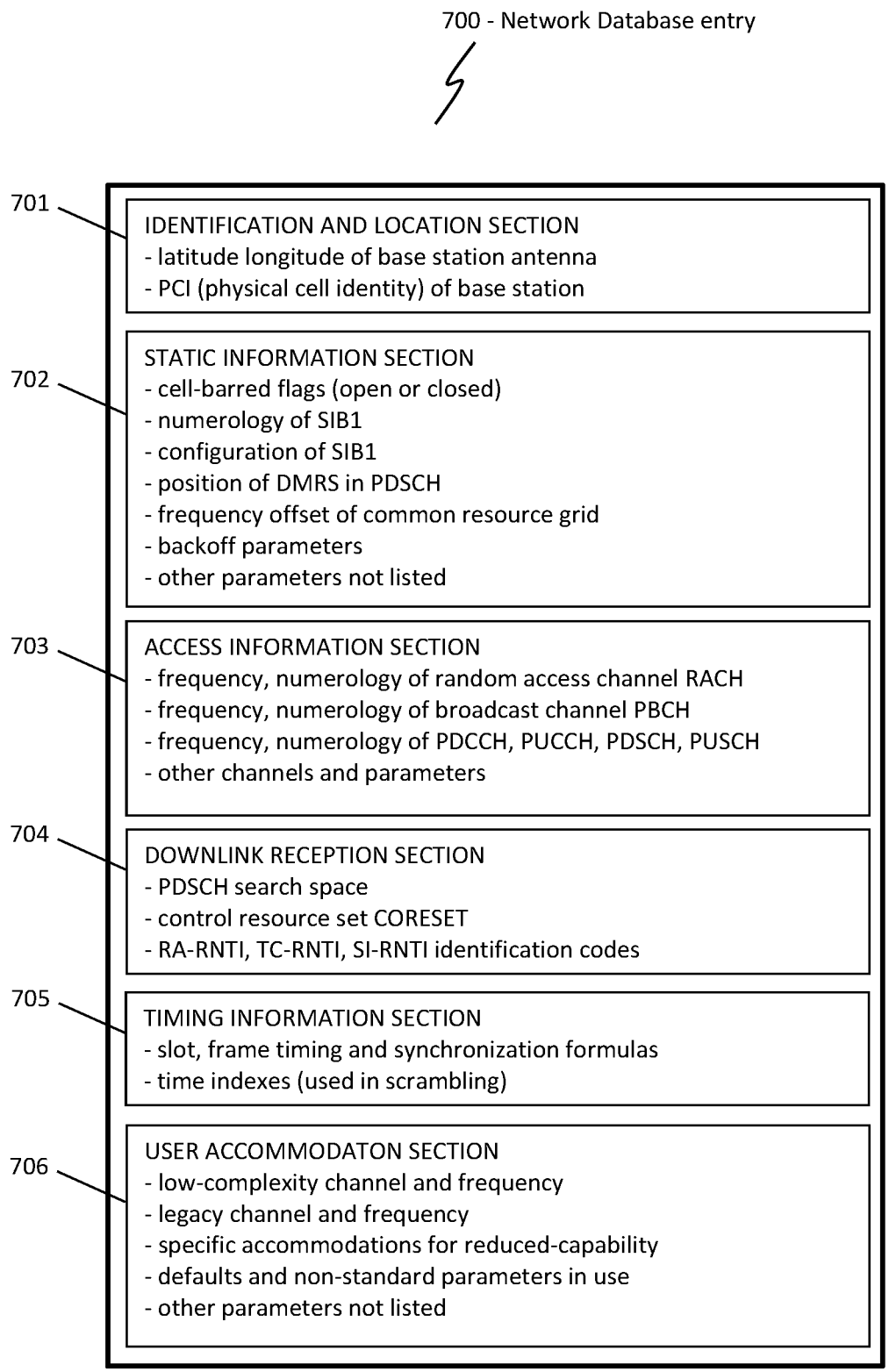
FIG. 7 is a chart showing an exemplary embodiment of a typical base station's entry in a network database, according to some embodiments.

FIG. 7 is a chart showing an exemplary embodiment of a hypothetical base station's section of a network database, according to some embodiments. In this non-limiting example, items of system information likely of interest to a prospective user device are shown as regions of a network database entry 700 for one base station. Parameters that are normally provided in the standard system information messages SSB and SIB1 may also be provided in the network database, so that a prospective user can acquire the system information without searching for the system information messages.

In the depiction, the network information is provided according to category, starting with the Identification and Location section 701 which is shown including the location coordinates of the base station (or more specifically, the location of its antenna), as well as the base station identification and possibly a MAC address or other identification codes.

Static information 702 may also be provided, including cell-barred flags indicating whether the base station is open or closed, specification of the SIB1 properties, the DMRS (demodulation reference signal) position in the downlink shared channel slot, an offset frequency between the broadcast channel and the common resource grid, backoff parameters, and/or other static parameters that a newly arriving user device may need. In an Access section 703, the network database may provide reception information about various channels such as the frequency, numerology (such as subcarrier spacing), and other channel-specific information about channels such as the random access and/or broadcast and/or other scheduled or unscheduled channels that a user device may use.

The network database may include a Downlink Reception area 704 which may provide information to assist the user device in receiving messages from the base station, such as the downlink search space, one or more CORESETs (control resource set), and various temporary identification codes such as the RA-RNTI for random access, TC-RNTI which is primarily for Msg3, SI-RNTI for system information messages, and the like. The network database may also provide a Timing section 705 which may include a table or formula (or subroutine or the like) for calculating specific times corresponding to frame boundaries and other time-dependent parameters. The formula may also calculate the half-frame bit, the slot and subframe synchronization bits, the FR2 time index and other descrambling time indexes, the frame boundary timing, the SFN (system frame number) for each frame, and the other time marks, based on a system clock or other time standard for example. The network database may thereby provide the timing information normally included in the system information messages, but statically and referenced to a universal time-base.

Finally, in the User Accommodation section 706, the network database may indicate whether the base station provides features that reduced-capability devices may require, or alternatively features that a high-performance or high-priority or emergency user may need. For example, the base station may indicate whether it provides a low-complexity channel such as a dedicated frequency for unscheduled, at-will, low-QoS, TDD communication between user devices and the base station with defaulted bandwidth, formats, and procedures, thereby minimizing demands on the user devices, and especially avoiding unnecessary signal processing such as encoding, scrambling, rate-matching, transforming, and the like. The network database may indicate whether it is in contact with emergency responders, and if not, may indicate another nearby base station that can provide that service. In addition, the base station may indicate whether it supports a legacy channel, such as a CDMA/CA (code division multiple access collision avoidance) channel, for user devices that prefer it, along with associated frequencies and bandwidths etc. The base station may also indicate whether it provides an option for low-usage devices to transmit and receive messages on the random access channel (or other allocated channel with few requirements) rather than on scheduled channels. The base station may also list further defaults not normally included in the SSB and SIB1 messages, to reduce the search space that limited devices would need to process.

All sections shown in the figure are optional. Other parameters not listed may be provided. Some of the listed parameters may be omitted from certain base stations' entries in the network database. The sections and/or parameters may be arranged differently from this non-limiting exemplary depiction.

An advantage of providing the system information for each base station in a freely accessible file may be that user devices may obtain the system information of a network before contacting the network, thereby avoiding certain delays. Another advantage may be that a copy of the network database may be downloaded or otherwise obtained by user devices, and the copy can be scanned to find a suitable base station independently thereafter. An advantage of providing a low-complexity channel may be to enable use cases involving low-cost, single-purpose wireless devices that may not be able to comply with complex 5G or 6G protocols. An advantage of providing a legacy channel may be to allow users to communicate using a well-developed, robust technology simpler than scheduled 5G and 6G. An advantage of declaring defaults for as many parameters and procedures as possible may be to reduce the overhead burden that a user device, not requiring high-performance communications, is expected to support. Another advantage may be that the depicted low-complexity procedures may be compatible with devices that may have difficulty complying with prior-art registration procedures.

As an alternative, the network database may be configured as a "blockchain" or distributed ledger, as opposed to a centralized managed repository. A blockchain is a collection of information shared by multiple participants and, using encryption and public keys, is essentially immune to malicious alteration. The information in a blockchain is organized as a series of linked files or "blocks", each block being linked to a previous block by a "hash" or encoded error-check value. The hash may encrypt a summary of the contents of the block that it belongs to, as well as the hash of immediately preceding block. Thus the blockchain can be added to by entities that know the hash procedure and have the necessary permissions, but cannot be otherwise changed. If someone malevolently tries to change the current block or any of the previous blocks, none of the hash codes will work thereafter, the faulty block will be exposed, the entire blockchain containing the fault will be discarded, and the ploy will fail. Blockchains can be public, private, or hybrid, permissioned or permissionless, accessible by proof-of-work or proof-of-stake or proof-of-identity, among many other versions. (For more information, see https://en.widipedia.org/wiki/Blockchain.)

A blockchain version of the network database may include a series of blocks. In a first embodiment, each block may be an updated version of the complete network database including any changes that have been made since the previous version. In a second embodiment, each block (after an initial block) may include just the changes or "transactions" since the previous version, and the fully updated network database can be constructed by software applying those sequential changes to the initial version of the database. As a third embodiment, the blocks may include the changes, and every Nth block may contain the fully updated database version including all the changes to that point, thereby making it easier to derive the latest version of the database. In a fourth embodiment, every Nth block may contain the fully updated database, whereas each intervening block may include all the accumulated changes in the previous blocks since the last full version of the database (that is, all the changes since the previous fully updated database version are accumulated in each intervening block), thereby further simplifying the updating. For example, every Nth block may include the current, updated version of the network database, whereas the N−1 intervening blocks may include changes relative to the last updated version. Thus every Nth block shows the updated database including all of the changes appearing in the previous N−1 blocks. Providing such accumulation blocks periodically in the blockchain, that apply all of the preceding changes, may thereby simplify the task of determining the current version of the database. In some embodiments, N may be ten or one thousand or one million. Each block may include an index indicating the position of the block relative to the most recent full version, in this scheme. For example, if N equals 100, then block 257 would indicate that the most recent fully updated version is in block 200, and that blocks 201-257 include changes to it. Each block includes a header containing a new hash code, which is derived mathematically from the previous block's hash code plus the contents of the new block. Each hash code is a 256-bit code, typically, which is not breakable with current technology. The hash codes protect each block, and thereby prevent alterations of the blockchain, other than authorized block additions. Each block's header may also include a timestamp and the size of the block, among other data.

In some embodiments, a blockchain of the network database may be a "hybrid" type, that is, with different permissions for different entities. For example, the general public may read and copy the latest version of the network database contained in the blockchain, but cannot read or copy the blocks directly, nor make any changes to parameters, in such embodiments. Only the base stations can update the parameter values, and only in their own entry of the database, but cannot add new blocks. Instead, each base station may forward its parameter changes to a network operator or system administrator, and the network operator or system administrator can accumulate the changes requested by the various base stations that it manages, and may then append a new block to the blockchain including those changes. Prospective user devices may thus read and copy the latest network database (or a local portion thereof), and may thereby obtain the current parameter settings for the base stations in a region, for example. Such users are termed "lightweight nodes" in the vernacular of blockchain, since they can acquire the data but cannot make any changes. Base stations may be termed "full nodes" having authority to change the parameters in their own entry of the network database, but not to create new blocks directly. Network operators or system administrators may be "publishing nodes" having authority to accumulate all the parameter updates in the entries of the base stations that they manage, construct the updates into a new block, hash it to the previous blockchain, and disseminate the updated version of the database globally. The publishing nodes may include software that keeps track of the parameter changes and applies them to the database, and thereby makes the updated network database available to the public without granting direct access to the blockchain blocks, in some embodiments. ("Nodes" of a blockchain are not to be confused with "nodes" of a wireless network.)

Some blockchains require certain "proofs" (authorization procedures) to access the blocks. Cryptocurrency blockchains usually require "proof-of-work" to claim additional value, or "proof-of-stake" to claim additional responsibility. Since the network database may be managed by network operators or system administrators worldwide, their access may be based on "proof-of-identity" which may be mediated by an encrypted key such as a public-private key pair, or a password specific to each qualified entity, according to some embodiments. The public users, on the other hand, may access the latest version of the database by reading it or copying it permissionlessly, that is, without proof of anything, from the publishing nodes or other distributed repositories, in this example. In this embodiment, a user may search, read, or copy the network database, which includes all of the changes accumulated to date. Users generally may not read the blockchain itself in this case. Instead, software at one of the blockchain repositories may apply the various parameter changes and thereby generate a current copy of the network database, which is then available to users. In addition, future changes that are scheduled in advance may be incorporated in the network database so that at a particular time when the change is scheduled to occur, the parameter value(s) affected by the change will automatically convert to the new value. In some embodiments, a downloaded copy of a local portion of the network database may include such parameter changes and their scheduled times, and the copy may apply those changes at the scheduled time automatically, even if the copy is off-line at the time, according to some embodiments.

An advantage of configuring the network database as a blockchain may be security, since each version is encryption-protected. Another advantage may be redundancy, since thousands or millions of copies worldwide would make it essentially immune to hacking. Another advantage may be that the blockchain can contain the latest network database version, since participating blockchain members (such as all system operators or network administrators worldwide) may update their parameter settings in real-time. Another advantage may be availability, since anyone may access the latest database settings from a copy of the blockchain. Another advantage may be auditability, since the publishing nodes may retain a complete sequence of blocks and may thereby identify each parameter change in time and place, if desired.

5G and especially 6G have enormous potential for high-end user devices such as computers and mobile phones with advanced software and powerful processors. However, many future communication applications are expected to involve a completely different family of devices, with substantially lower cost, performance, and communication demands than past wireless systems. It would be inefficient to establish a separate wireless domain adapted to low-end devices, but overlapping and competing with 5G and 6G, especially since there is only one frequency spectrum which all wireless technologies must inescapably share. Low-demand devices could be upgraded to comply with 5G and 6G standards at substantial extra cost, which would exclude or substantially attenuate many promising cost-constrained use cases. A much more efficient path forward would be to provide, in 5G and 6G, optional low-complexity procedures which can accommodate devices with far lower performance capabilities than current wireless devices. Even more preferable are low-complexity protocols, configured to enable reduced-capability user devices while minimizing demands on 5G/6G base stations, and also to avoid interference with the higher-priority applications which may be communicating concurrently on the scheduled channels. It is possible to provide such low-complexity protocols and low-complexity channels without impacting, or at most minimally impacting, the scheduled network, because reduced-capability devices generally do not require low latency, high reliability, large messages, wide bandwidth, or high usage. On the contrary, most of the emergent IoT applications involve infrequent, short messages transmitted locally by single-purpose sensors or actuators, placing very minimal demands on the network.

The systems and methods disclosed herein are intended to provide such non-interfering low-complexity options. It is important to incorporate the disclosed options and procedures early, while the 6G standards are still being developed. Experience with 4G demonstrates that trying to redesign an already fully-established wireless technology to accommodate a different family of electronics is difficult. The options described herein include a publicly accessible network database to assist devices in selecting a base station and acquiring system information before contacting it. When low-complexity procedures are incorporated in the developing 5G and 6G standards, these procedures will open opportunities for many low-demand applications involving low-cost wireless devices, applications that would not have been feasible absent the low-complexity procedures disclosed herein.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. Non-transitory computer-readable media wherein:
 a) the media contain a database comprising a plurality of entries, each entry comprising data about a wireless network base station associated with the entry;
 b) wherein each entry further includes an indication of a location of the associated base station or an indication of a location of an antenna of the the associated base station;
 c) wherein each entry further includes a frequency of a random access channel and a frequency of a broadcast channel of the associated base station; and
 d) wherein the database is configured to be searchable according to a user-specified or user-associated location.

2. The media of claim 1, wherein the broadcast channel and the random access channel are configured according to 5G or 6G technology.

3. The media of claim 1, wherein each entry indicates whether the associated base station accepts new users.

4. The media of claim 3, wherein the database is configured to indicate which base station, accepting new users, is closest to the user-specified or user-associated location.

5. The media of claim 1, wherein the database is stored on an international computer-readable on-line information network and is publicly accessible for use and for downloading.

6. The media of claim 5, wherein the database is configured such that a copy of the database, or a copy of a portion of the database, is searchable according to the user-specified or user-associated location.

7. The media of claim 1, wherein each entry indicates whether the associated base station supports low-complexity protocols configured to enable reduced-capability user devices to communicate with the associated base station.

8. The media of claim 7, wherein each entry associated with a base station that supports low-complexity protocols, indicates a frequency or a frequency band for transmission of low-complexity messages, wherein the low-complexity protocols comprise transmission contention-based and without grant, on the low-complexity channel.

9. The media of claim 8, wherein the database is configured to indicate which base station, that accepts new users and supports low-complexity protocols, is closest to the user-specified or user-associated location.

10. The media of claim 1, wherein the database is further configured such that each entry can be revised by the associated base station or by a network system administrator of the associated base station.

11. The media of claim 1, wherein the database is configured to provide, in a particular entry of the database, sufficient system information about a particular base station, such that a user device can communicate with and register on the particular base station without receiving an SSB (synchronization signal block) message from the particular base station.

* * * * *